(12) United States Patent
Gou et al.

(10) Patent No.: US 11,558,099 B2
(45) Date of Patent: Jan. 17, 2023

(54) UPLINK CONTROL RECEIVING METHOD AND DEVICE, UPLINK CONTROL SENDING METHOD AND DEVICE, BASE STATION, AND USER EQUIPMENT

(71) Applicant: ZTE CORPORATION, Guangdong (CN)

(72) Inventors: Wei Gou, Shenzhen (CN); Feng Bi, Shenzhen (CN); Peng Hao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 720 days.

(21) Appl. No.: 16/484,100

(22) PCT Filed: Feb. 6, 2018

(86) PCT No.: PCT/CN2018/075369
§ 371 (c)(1),
(2) Date: Nov. 25, 2019

(87) PCT Pub. No.: WO2018/141302
PCT Pub. Date: Aug. 9, 2018

(65) Prior Publication Data
US 2020/0084762 A1    Mar. 12, 2020

(30) Foreign Application Priority Data

Feb. 6, 2017    (CN) .......................... 201710073272.8

(51) Int. Cl.
*H04W 4/00*    (2018.01)
*H04B 7/08*    (2006.01)
(Continued)

(52) U.S. Cl.
CPC ........... *H04B 7/088* (2013.01); *H04B 7/0602* (2013.01); *H04B 7/0626* (2013.01);
(Continued)

(58) Field of Classification Search
CPC ......... H04W 72/0413; H04W 72/0446; H04W 72/046; H04W 72/1284; H04W 74/004;
(Continued)

(56) References Cited

U.S. PATENT DOCUMENTS

2016/0192349 A1*  6/2016  Wei ...................... H04M 1/725
                                                                    370/329
2017/0155488 A1    6/2017  Saxena et al.
(Continued)

FOREIGN PATENT DOCUMENTS

CN         103312650 A       9/2013
CN         105745860 A       7/2016
(Continued)

OTHER PUBLICATIONS

LG Electronics, "Discussion on downlink design in multi-beam operation", R1-1700499, Jan. 16-20, 2017. (From Applicant's IDS) (Year: 2017).*

(Continued)

*Primary Examiner* — Mang Hang Yeung
(74) *Attorney, Agent, or Firm* — Knobbe, Martens, Olson & Bear, LLP

(57) ABSTRACT

Provided are an uplink control receiving method and device, an uplink control sending method and device, a base station, and a user equipment. The method includes: configuring or specifying, for the receiving end, an orthogonal frequency division multiplexing (OFDM) symbol for transmitting the uplink control in a transmission unit, the location of the OFDM symbol in which the uplink control is located in the transmission unit and the location of an OFDM symbol in which uplink data is located in the transmission unit remaining continuous; and receiving the uplink control in the configured or specified OFDM symbol.

18 Claims, 7 Drawing Sheets

(51) Int. Cl.
  *H04W 76/27* (2018.01)
  *H04B 7/06* (2006.01)
  *H04L 5/00* (2006.01)
  *H04L 27/26* (2006.01)
  *H04W 72/04* (2009.01)
  *H04W 72/12* (2009.01)
  *H04W 74/00* (2009.01)

(52) U.S. Cl.
  CPC .......... *H04L 5/0007* (2013.01); *H04L 5/0044* (2013.01); *H04L 5/0055* (2013.01); *H04L 27/2602* (2013.01); *H04L 27/2605* (2013.01); *H04W 72/046* (2013.01); *H04W 72/0413* (2013.01); *H04W 72/0446* (2013.01); *H04W 72/1284* (2013.01); *H04W 74/004* (2013.01); *H04W 76/27* (2018.02)

(58) Field of Classification Search
  CPC ... H04W 76/27; H04B 7/0602; H04B 7/0626; H04B 7/0695; H04B 7/088; H04L 5/0007; H04L 5/0055; H04L 27/2605; H04L 1/1861; H04L 5/0044; H04L 5/0053; H04L 5/0094; H04L 27/2602
  USPC .......................................................... 370/329
  See application file for complete search history.

(56) References Cited

U.S. PATENT DOCUMENTS

2018/0076917 A1* 3/2018 Pan ...................... H04B 7/0639
2018/0132264 A1* 5/2018 Jung ..................... H04L 1/1864

FOREIGN PATENT DOCUMENTS

| CN | 105991256 A | 10/2016 |
| WO | WO 2013/165222 A1 | 11/2013 |
| WO | 2016/186554 A1 | 11/2016 |

OTHER PUBLICATIONS

International Search Report of corresponding PCT Application No. PCT/CN2018/075369—4 pages (dated Apr. 27, 2018).
LG Electronics, "Discussion on Downlink Design in Multi-beam Operation", 3GPP TSG RAN WGI Meeting NR-AH1, R1-1700499—5 pages(Jan. 20, 2017).
Nokia et al., "Basic Frame Structure Principles for New Radio", 3GPP TSG-RAN WGI#86, R1-167262—4 pages (Aug. 26, 2016).
Chinese First Search Report for Chinese Application No. 2017100732728 dated Dec. 17, 2021.
Chinese Office Action for Chinese Application No. 201710073272.8 dated Dec. 23, 2021.
R1-1612840 "Decoupled Control and Data for NR": 3GPP TSG-RAN WG1 #87 Reno, USA, Nov. 14-18, 2016.

* cited by examiner

UPLINK CONTROL RECEIVING METHOD AND DEVICE, UPLINK CONTROL SENDING METHOD AND DEVICE, BASE STATION, AND USER EQUIPMENT

TECHNICAL FIELD

The present disclosure relates to the field of communications and, for example, relates to an uplink control receiving method, an uplink control receiving device, an uplink control sending method, an uplink control sending device, a base station, and a user equipment.

BACKGROUND

The new generation mobile communication system, i.e., New Radio (NR), is being researched and standardized, which is also one of current priorities of the 3rd Generation Partnership Project (3GPP).

In the currently determined NR system, three typical service types exist in the future. The common services include: enhanced Mobile BroadBand (eMBB), Ultra-Reliable and Low Latency Communications (URLLC) and massive Machine Type Communications (mMTC). These services have different requirements for latency, coverage and reliability. For example, the eMBB mainly focuses on high peak transmission rate, has a low requirement on latency (no demand for low latency), and has a medium requirement on reliability. The URLLC focuses on low latency and high-reliability transmission, and is very demanding on latency. The mMTC focuses on a large number of terminals, large connection density and requires broader transmission coverage, while has little requirement on latency.

Some wireless data and control structures designed for the 5th generation wireless communication technology (5G) are described below. FIGS. 1 and 2 are structural diagrams of a transmission unit discussed in the early NR technology. As shown in FIG. 1, it can be considered as one basic transmission unit, for example, one Transmission Time Interval (TTI) composed of multiple Orthogonal Frequency Division Multiplexing (OFDM) symbols, or one subframe composed of multiple TTIs. The downlink control is control type information related to downlink data, which is sent by a base station to a user equipment (UE). The guard period (GP) is time for implementing transition between receiving or transmitting states. The uplink data is data sent by the UE to the base station. The uplink control is information sent by the UE to the base station, such as downlink data receiving acknowledgement (ACK)/non-acknowledgement (NACK) feedback information, channel state information (CSI), a scheduling request and so on, which is information that the UE needs to send to the base station except the uplink data. FIG. 2 shows a basic transmission unit for downlink data transmission, which, for example, contains downlink control, downlink data, a GP and uplink control. The function of each part is the same as the corresponding part in FIG. 1.

Such basic transmission units are allowed to be aggregated. That is, multiple basic units are connected in series to form a longer transmission unit for data transmission, and in-between transmission units may be data only and contain no control parts.

In one transmission unit, when uplink control is contained, the uplink control is considered to contain one OFDM symbol in the related art, and such uplink control is referred to as short format uplink control. In order to support time division multiplexing of uplink controls of different receiving ends (e.g., UEs) in one transmission unit, a mechanism is also being considered to be introduced to indicate for the UE an OFDM symbol in which the UE's own uplink control is located. That is, multiple uplink controls will be included in one transmission unit, and each uplink control occupies one OFDM symbol.

If multiple uplink controls are included in one transmission unit and each uplink control occupies one OFDM symbol, a receiving end or a sending end can be simply implemented with the highest efficiency only through the combination of the uplink control and the way of configuring the location of a beam.

Possible problems existing when time division multiplexing of multiple uplink controls of different receiving ends exist in one transmission unit will be analyzed below.

It is assumed (only for convenience of description, and the assumed scenario does exist) that in one transmission unit, there are two receiving ends, where the receiving end 1 needs to transmit uplink data and uplink control, and the receiving end 2 only needs to transmit uplink control. It is assumed that the receiving end 1 corresponds to a beam direction 1, the receiving end 2 corresponds to a beam direction 2, and a sending end (e.g. a base station) cannot receive the beam directions 1 and 2 in one OFDM symbol at the same time (which may be caused due to various reasons, for example, the base station only has one radio frequency link). It is assumed herein that each uplink control occupies one OFDM symbol.

If a receiving end 1 transmits uplink data in the uplink data part of the transmission unit in the beam direction 1, in the transmission unit, the uplink control corresponding to the beam direction 2, i.e., the uplink control of the receiving end 2, is configured in an OFDM symbol after and adjacent to the uplink data (i.e., configured in the penultimate OFDM symbol), and the uplink control corresponding to the beam direction 1 is configured in the last OFDM symbol. At this time, the processing of the receiving end 1 becomes complicated. The receiving end 1 herein transmits the uplink data until the antepenultimate OFDM symbol, then the sending is suspended until the penultimate OFDM symbol ends, and then continues to send the uplink control in the last OFDM symbol. At this time, the uplink control of the receiving end 1, due to insufficient adjustment of automatic gain control (AGC) of the receiving end and other reasons, may be subjected to decreased sending performance (after a device starts sending, a power amplifier level needs to climb up for stable sending), and a gap exists in the sending performed by the receiving end 1 (e.g., the gap exists in the penultimate OFDM symbol), making the implementation of the receiving end 1 complicated. The processing of the sending end (e.g., a base station) will also become complicated due to the occurrence of the gap.

Therefore, in the related art, the configuration manner of locations of OFDM symbols for uplink controls of receiving ends may cause complicated processing.

SUMMARY

Embodiments of the present disclosure provide an uplink control receiving method and device, an uplink control sending method and device, a base station, and a user equipment, so as to at least solve problems complicated to be processed existing in a configuration manner of locations of Orthogonal Frequency Division Multiplexing (OFDM) symbols for uplink controls of receiving ends in the related art.

An uplink control receiving method includes: configuring or specifying, for the receiving end, an OFDM symbol for transmitting the uplink control in the transmission unit, the location of the OFDM symbol in which the uplink control is located in the transmission unit and the location of an OFDM symbol in which uplink data is located in the transmission unit remaining continuous;

and receiving the uplink control in the configured or specified OFDM symbol.

An uplink control receiving method includes: specifying a beam direction used for sending uplink control in an OFDM symbol in which uplink control is located in a transmission unit, and receiving the uplink control according to the specified beam direction used by the uplink control; or, configuring a beam direction used for sending uplink control in an OFDM symbol in which uplink control is located in the transmission unit, and when the beam direction used for sending the uplink control in the OFDM symbol in which the uplink control is located in the transmission unit is configured, sending signaling to inform a receiving end, and receiving the uplink control according to the configured beam direction used by the uplink control.

An uplink control sending method includes: determining an OFDM symbol in which an uplink control of a receiving end is located in a transmission unit; and sending the uplink control in the determined OFDM symbol.

An uplink control sending method includes: determining a beam direction used for transmitting an uplink control in an OFDM symbol in which the uplink control is located; and sending the uplink control using the determined beam direction.

An uplink control receiving device includes: a configuring module, which is configured to configure or specify, for a receiving end, an OFDM symbol for transmitting uplink control in the transmission unit, the location of the OFDM symbol in which the uplink control is located in the transmission unit and the location of an OFDM symbol in which uplink data is located in the transmission unit remaining continuous; and a receiving module, which is configured to receive the uplink control in the configured or specified OFDM symbol.

An uplink control receiving device includes: a configuring module, which is configured to specify a beam direction used for sending uplink control in an OFDM symbol in which uplink control is located in a transmission unit; a first receiving module, which is configured to receive the uplink control according to the specified beam direction used by the uplink control; or the configuring module is configured to configure a beam direction used for sending uplink control in an OFDM symbol in which uplink control is located in a transmission unit; a sending module, which is configured to, when the beam direction capable of being used for sending the uplink control in the OFDM symbol in which the uplink control is located in the transmission unit is configured, send signaling to inform a receiving end; and a second receiving module, which is configured to receive the uplink control according to the configured beam direction used by the uplink control.

An uplink control sending device includes: a determining module, which is configured to determine an OFDM symbol in which uplink control of a receiving end is located in a transmission unit; and a sending module, which is configured to send the uplink control in the determined OFDM symbol.

An uplink control sending device includes: a determining module, which is configured to determine a beam direction used for transmitting uplink control in an OFDM symbol in which the uplink control is located; and a sending module, which is configured to send the uplink control using the determined beam direction.

A base station includes a processor and a transmission device. The processor is configured to configure or specify, for the receiving end, an OFDM symbol for transmitting the uplink control in the transmission unit. The location of an OFDM symbol in which the uplink control is located in the transmission unit and the location of an OFDM symbol in which uplink data is located in the transmission unit remain continuous. The transmission device is configured to receive the uplink control in the configured or specified OFDM symbol.

A base station includes a processor and a transmission device. The processor is configured to specify a beam direction used for sending uplink control in an OFDM symbol in which uplink control is located in a transmission unit, and the transmission device is configured to receive the uplink control according to the specified beam direction used by the uplink control. Alternatively, the processor is configured to configure a beam direction used for sending uplink control in an OFDM symbol in which uplink control is located in a transmission unit, and the transmission device is configured to, when the beam direction capable of being used for sending the uplink control in the OFDM symbol in which the uplink control is located in the transmission unit is configured, send signaling to inform a receiving end, and receive the uplink control according to the configured beam direction used by the uplink control.

A user equipment includes a processor and a transmission device. The processor is configured to determine an OFDM symbol in which uplink control of a user equipment is located in a transmission unit. The transmission device is configured to send the uplink control in the determined OFDM symbol.

A user equipment includes a processor and a transmission device. The processor is configured to determine a beam direction used for transmitting uplink control in an OFDM symbol in which the uplink control is located. The transmission device is configured to send the uplink control using the determined beam direction.

A wireless communication system includes a base station and a user equipment. The base station includes a first processor and a first transmission device. The use equipment includes a second processor and a second transmission device. The first processor is configured to configure or specify, in the transmission unit, for the user equipment, an OFDM symbol for transmitting the uplink control. The location of an OFDM symbol in which the uplink control is located in the transmission unit and the location of an OFDM symbol in which uplink data is located in the transmission unit remain continuous. The first transmission device is configured to receive the uplink control in the configured or specified OFDM symbol. The second processor is configured to determine an OFDM symbol in which uplink control of the user equipment is located in the transmission unit. The second transmission device is configured to send the uplink control in the determined OFDM symbol.

A storage medium is provided. The storage medium is configured to store program codes for executing following steps: configuring or specifying, in the transmission unit, for the receiving end, an OFDM symbol for transmitting the uplink control, the location of an OFDM symbol in which the uplink control is located in the transmission unit and the location of an OFDM symbol in which uplink data is located in the transmission unit remaining continuous; and receiving the uplink control in the configured or specified OFDM symbol.

A storage medium is provided. The storage medium is configured to store program codes for executing following steps: specifying a beam direction used for sending uplink control in an OFDM symbol in which uplink control is located in a transmission unit, and receiving the uplink control according to the specified beam direction used by the uplink control; or, configuring a beam direction used for sending uplink control in an OFDM symbol in which uplink control is located in the transmission unit, and when the beam direction used for sending the uplink control in the OFDM symbol in which the uplink control is located in the transmission unit is configured, sending signaling to inform a receiving end, and receiving the uplink control according to the configured beam direction used by the uplink control.

A storage medium is provided. The storage medium is configured to store program codes for executing following steps: determining an OFDM symbol in which uplink control of a receiving end is located in a transmission unit; and sending the uplink control in the determined OFDM symbol.

A storage medium is provided. The storage medium is configured to store program codes for executing following steps: determining a beam direction used for transmitting uplink control in an OFDM symbol in which the uplink control is located; and sending the uplink control using the determined beam direction.

Since the location of an OFDM symbol which is configured or specified by a sending end for the receiving end in a transmission unit and used for transmitting uplink control in the transmission unit and the location of an OFDM symbol in which uplink data is located in the transmission unit remain continuous, the uplink control receiving method and the uplink control sending method provided by the present disclosure avoid the occurrence of a neutral position between the sending of uplink data and the sending of uplink control by the receiving end. Therefore, problems of complicated processing existing in the configuration manner of OFDM symbol locations of receiving end uplink control in the related art may be solved, and a performance of reducing uplink control processing complexity may be achieved.

BRIEF DESCRIPTION OF DRAWINGS

The drawings descried herein are used to provide a further understanding of the present disclosure, and form a part of the present disclosure. In the drawings:

FIG. 9(*b*) is a schematic diagram of multiple channel resources in one slot according to an embodiment;

DETAILED DESCRIPTION

Hereinafter the present disclosure will be described in detail with reference to the drawings and in conjunction with embodiments. The terms "first", "second" and the like in the description, claims and the drawings of the present disclosure are used to distinguish between similar objects and are not necessarily used to describe a particular order or sequence.

Embodiment 1

Figure 3:
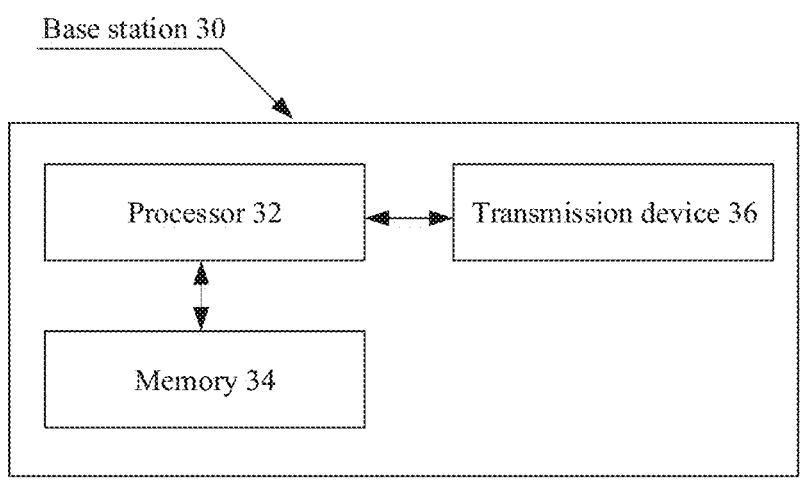
FIG. 3 is a block diagram of a hardware structure of a base station involved in an uplink control receiving method according to an embodiment.

A method embodiment provided by an embodiment may be executed in a base station, a user equipment (UE), a mobile terminal, a computer terminal or other similar computing apparatuses. In an example in which the method is executed in a base station, FIG. 3 is a block diagram of a hardware structure of the base station performing an uplink control receiving method according to this embodiment. As shown in FIG. 3, the base station 30 may include one or more (only one is shown in FIG. 3) processors 32 (the processors 32 may include, but are not limited to, a microprocessor such as a microcontroller unit (MCU), a programmable logic device such as a field programmable gate array (FPGA) or other processing devices), a memory 34 configured to store data, and a transmission device 36 configured to implement a communication function. The structure shown in FIG. 3 is merely illustrative and not intended to limit the structure of the electronic device described above. For example, the base station 30 may include more or less components than the components shown in FIG. 3, or has a configuration different from the configuration shown in FIG. 3.

The memory 34 may be configured to store software programs and modules of application software, such as program instructions or modules corresponding to an uplink control receiving method in the embodiment of the present disclosure. The processor 32 executes the software programs and modules stored in the memory 34 to perform various functional applications and data processing, that is, to implement the method described above. The memory 34 may include a high-speed random access memory, and may further include a nonvolatile memory, such as one or more magnetic storage devices, flash memories or other nonvolatile solid-state memories. In some examples, the memory 34 may include memories which are remotely disposed with respect to the processor 32 and these remote memories may be connected to the base station 30 via a network. Examples of the preceding network include the Internet, an intranet, a local area network, a mobile communication network and a combination thereof.

The transmission device 36 is configured to receive or transmit data via a network. Examples of such a network may include a wireless network provided by a communication provider of the base station 30. In one example, the transmission device 36 includes a network interface controller (NIC), through which the base station may be connected to other network equipment and thus be capable of communicating with the Internet. In one example, the transmission device 36 may be a radio frequency (RF) module, which is configured to communicate with the Internet in a wireless way.

Figure 4:
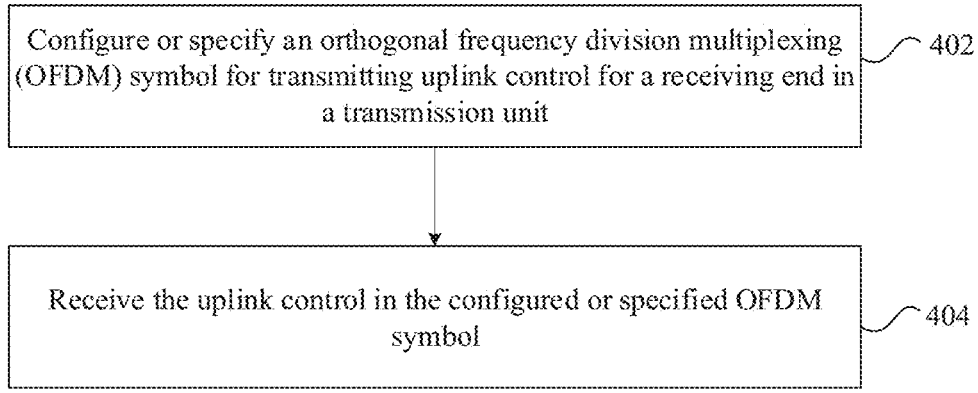
FIG. 4 is a flowchart one of an uplink control receiving method according to an embodiment.

An uplink control receiving method executed on the preceding base station is provided in this embodiment. FIG. 4 is a flowchart one of an uplink control receiving method according to this embodiment. As shown in FIG. 4, the method includes steps described below.

In step 402, an orthogonal frequency division multiplexing (OFDM) symbol for transmitting an uplink control is configured or specified for a receiving end in a transmission unit. The location of the OFDM symbol in which the uplink control is located in the transmission unit and the location of an OFDM symbol in which uplink data is located in the transmission unit remain continuous.

In step 404, the uplink control is received from the configured or specified OFDM symbol.

Through the above steps, since the location of an OFDM symbol, which is configured or specified by a sending end for the receiving end in a transmission unit and is used for transmitting uplink control, in the transmission unit and the location of an OFDM symbol in which uplink data is located in the transmission unit remain continuous, problems of complicated processing caused by the configuration manner of locations of OFDM symbols for uplink controls of receiving ends in the related art are solved, reducing uplink control processing complexity.

In an embodiment, the above steps may be executed by a base station, a cell base station, a remote radio unit, etc.

In an embodiment, for the specifying manner, the sending end and the receiving end may determine the OFDM symbol according to the specifying manner without interacting with each other. For example, an OFDM symbol used for receiving uplink control last time is specified to be used. In another example, an OFDM symbol determined using a preset rule is specified to be used.

In an embodiment, the uplink control meets at least one of: the uplink control of one receiving end occupying at least one OFDM symbol; the uplink control being configured to send acknowledgement/negative-acknowledgement (ACK/NACK) information, channel state information (CSI), or beam direction information; the uplink control being located in an OFDM symbol at an end of the transmission unit; the uplink control being located in an OFDM symbol before an OFDM symbol transmitting uplink data in the transmission unit; or the uplink control being an area for transmitting a physical uplink control channel (PUCCH) or an area for transmitting uplink control information (UCI).

In an embodiment, the transmission unit may be a subframe, a slot, a mini slot, etc., and the OFDM symbol may be other resource unit of time-frequency resources, which is used for characterizing a resource magnitude.

In an embodiment, in the step 402, OFDM symbols for transmitting uplink controls may be respectively configured or specified for receiving ends in the transmission unit according to at least one of beam directions of the receiving ends, a beam direction of the transmitting unit or the quantity of radio frequency links owned by the sending end. The beam direction of the receiving end includes at least one of: a beam direction of uplink data of the receiving end, or a beam direction of uplink control of the receiving end. The beam direction of the transmission unit includes at least one of: a beam direction used for transmitting uplink data in the transmission unit, or a beam direction used for transmitting uplink control in the transmission unit. The beam direction of uplink data of the receiving end refers to a beam direction used by the receiving end for sending uplink data. The beam direction of uplink control of the receiving end refers to a beam direction used by the receiving end for sending uplink control. The above are only different in the form of expressions and their meanings are the same.

In an embodiment, location information of the OFDM symbol for transmitting the uplink control may be configured for the receiving end using various manners. For example, the above location information may be configured using at least one of following manners.

When uplink controls of multiple beam directions need to be transmitted in the transmission unit, an uplink control with a beam direction the same as a beam direction used for transmitting uplink data in the transmission unit is configured or specified in an OFDM symbol adjacent to an OFDM symbol transmitting uplink data in the transmission unit, or is configured or specified in at least two continuous OFDM symbols starting from an OFDM symbol adjacent to an OFDM symbol transmitting uplink data in the transmission unit.

When the sending end has multiple radio frequency links and multiple beam directions transmitting uplink data in the transmission unit exist, an uplink control with a beam direction the same as at least one of the beam directions used for transmitting uplink data in the transmission unit is configured or specified in an OFDM symbol adjacent to an OFDM symbol transmitting uplink data in the transmission unit, or is configured or specified in at least two continuous OFDM symbols starting from an OFDM symbol adjacent to an OFDM symbol transmitting uplink data in the transmission unit.

When a beam direction the same as at least one of beam directions used for transmitting uplink data in the transmission unit exists in PUCCHs of receiving ends of different beam directions, UCI with a beam direction the same as at least one of beam directions transmitting the uplink data is carried in a PUCCH in an OFDM symbol immediately before or after an OFDM symbol transmitting uplink data in the transmission unit, where a configured or specified OFDM symbol transmitting a PUCCH is an OFDM symbol adjacent to the OFDM symbol transmitting uplink data in the transmission unit; or, a configured or specified OFDM symbol transmitting a PUCCH is at least two continuous OFDM symbols starting from an OFDM symbol adjacent to the OFDM symbol transmitting uplink data in the transmission unit.

When multiple uplink controls located in different OFDM symbols exist in the transmission unit, an uplink control with a beam direction the same as at least one of beam directions transmitting uplink data in the transmission unit is configured or specified in an OFDM symbol adjacent to an OFDM symbol transmitting uplink data in the transmission unit, or is configured or specified in at least two continuous OFDM symbols starting from an OFDM symbol adjacent to an OFDM symbol transmitting uplink data in the transmission unit.

When a beam direction of uplink data and a beam direction of uplink control of the same receiving end in a transmission unit are different, the uplink control of the receiving end with the beam direction of uplink data different from the beam direction of the uplink control is configured or specified in an OFDM symbol adjacent to an OFDM symbol transmitting uplink data in the transmission unit, or is configured or specified in at least two continuous OFDM symbols starting from an OFDM symbol adjacent to an OFDM symbol transmitting uplink data in the transmission unit.

In an embodiment, the OFDM symbol for transmitting the uplink control may be configured for the receiving end using a following manner: performing configuration through at least one of a physical layer signaling or a high-layer signaling.

In an embodiment, the physical layer signaling may include downlink control information, the high-layer signaling may include a radio resource control (RRC) message, the high-layer signaling may configure a preset location of uplink control in the transmission unit when the physical layer signaling and the high-layer signaling are used simultaneously, the preset location includes an end location of the transmission unit or a location before transmitting uplink data, and the physical layer signaling configures an OFDM symbol transmitting the uplink control. That is, the high-layer signaling indicates a relative location of the OFDM symbol in which the uplink control is located, and the physical layer signaling indicates parameters such as the number of OFDM symbols transmitting the uplink control.

In an embodiment, in the process of the step 404, a beam direction capable of being used for sending uplink control in the OFDM symbol in which the uplink control is located in the transmission unit may be further configured or specified; and in the step 404, when configuring the beam direction capable of being used for sending the uplink control in the OFDM symbol in which the uplink control is located in the transmission unit, signaling is sent to inform the receiving end (that is, to inform the receiving end of the beam direction capable of being used through the signaling).

In an embodiment, the step in which a beam direction capable of being used for sending uplink control in the OFDM symbol in which the uplink control is located in the transmission unit is specified may include: when signaling for informing the beam direction used for sending the uplink control in the OFDM symbol in which the uplink control is located in the transmission unit is not sent, defaulting the beam direction capable of being used by the receiving end for sending the uplink control as all or at least one of beam directions used for transmitting uplink data in the transmission unit; or when signaling for informing the beam direction used for sending the uplink control in the OFDM symbol in which the uplink control is located in the transmission unit is not sent, defaulting the beam direction capable of being used by the receiving end for sending the uplink control as all or at least one of beam directions used for transmitting uplink data or an uplink control in a transmission unit before the transmission unit; or when signaling for informing the beam direction used for sending the uplink control in the OFDM symbol in which the uplink control is located in the transmission unit is not sent, defaulting the beam direction capable of being used by the receiving end for sending the uplink control as all or at least one of beam directions used for receiving downlink data in the transmission unit.

In an embodiment, the uplink control receiving method provided in the embodiment may be suitable for a scenario in which the transmission unit includes uplink controls of multiple receiving ends and the uplink controls of the receiving ends are multiplexed in a time-division manner.

Figure 5:
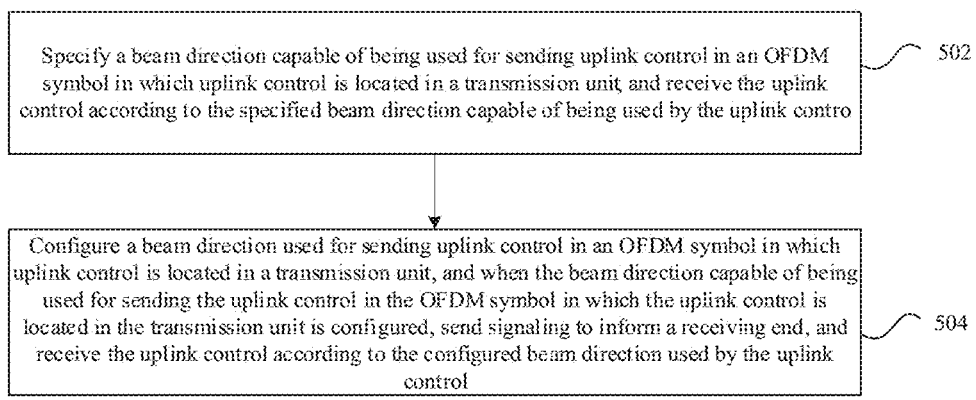
FIG. 5 is a flowchart two of an uplink control receiving method according to an embodiment.

An uplink control receiving method executed on the preceding base station is further provided in an embodiment. FIG. 5 is a flowchart two of an uplink control receiving method according to the embodiment. As shown in FIG. 5, the method includes steps described below.

In step 502, a beam direction capable of being used for sending an uplink control in an OFDM symbol in which the uplink control is located in a transmission unit is specified, and the uplink control is received according to the specified beam direction capable of being used by the uplink control. Alternatively, in step 504, a beam direction used for sending an uplink control in an OFDM symbol in which the uplink control is located in a transmission unit is configured, and when configuring the beam direction capable of being used for sending the uplink control in the OFDM symbol in which the uplink control is located in the transmission unit, signaling is sent to inform a receiving end, and the uplink control is received according to the configured beam direction used by the uplink control.

Through the above steps, the sending end and the receiving end configure or specify the beam direction capable of being used for sending uplink control in the OFDM symbol in which the uplink control is located in the transmission unit, so that the receiving end can send the uplink control in a range of the beam direction capable of being used, solving problems of complicated processing existing in the configuration manner of locations of OFDM symbols for uplinks controls of receiving ends in the related art, and reducing the uplink control processing complexity.

In an embodiment, the step in which a beam direction capable of being used for sending uplink control in the OFDM symbol in which the uplink control is located in the transmission unit is specified may include: when signaling for informing the beam direction used for sending the uplink control in the OFDM symbol in which the uplink control is located in the transmission unit is not sent, defaulting the beam direction capable of being used by the receiving end for sending the uplink control as all or at least one of beam directions used for transmitting uplink data in the transmission unit; or when signaling for informing the beam direction used for sending the uplink control in the OFDM symbol in which the uplink control is located in the transmission unit is not sent, defaulting the beam direction capable of being used by the receiving end for sending the uplink control as all or at least one of beam directions used for transmitting uplink data or an uplink control in a transmission unit before the transmission unit; or when signaling for informing the beam direction used for sending the uplink control in the OFDM symbol in which the uplink control is located in the transmission unit is not sent, defaulting the beam direction capable of being used by the receiving end for sending the uplink control as all or at least one of beam directions used for receiving downlink data in the transmission unit.

In an embodiment, the uplink control meets at least one of: the uplink control of one receiving end occupying at least one OFDM symbol; the uplink control being configured to send ACK/NACK information, CSI, or beam direction information; the uplink control being located in an OFDM symbol at an end of the transmission unit; the uplink control being located in an OFDM symbol before the OFDM symbol transmitting uplink data in the transmission unit; or the uplink control being an area for transmitting a PUCCH or an area for transmitting UCI.

Figure 6:
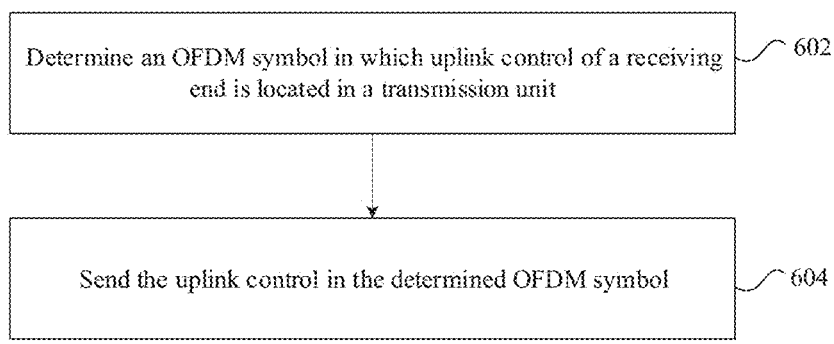
FIG. 6 is a flowchart one of an uplink control sending method according to an embodiment.

An uplink control sending method is further provided in an embodiment. FIG. 6 is a flowchart one of the uplink control sending method according to the embodiment. As shown in FIG. 6, the method includes steps described below.

In step 602, an OFDM symbol in which an uplink control of a receiving end is located in a transmission unit is determined.

In step 604, the uplink control is sent in the determined OFDM symbol.

Through the above steps, the receiving end determines the OFDM symbol in which uplink control of the receiving end is located in the transmission unit, and the location of an OFDM symbol in which the uplink control is located in the transmission unit and the location of an OFDM symbol in which uplink data is located in the transmission unit remain continuous, solving problems of complicated processing existing in the configuration manner of locations of OFDM symbols for uplink controls of receiving ends in the related art, and reducing the uplink control processing complexity.

In an embodiment, the above steps may be executed by a UE, a terminal, etc.

In an embodiment, in the step 602, the OFDM symbol in which the uplink control is located in the transmission unit may be determined using various manners. For example, the above OFDM symbol may be determined using at least one of following manners.

When a beam direction of the uplink control is the same as a beam direction used for transmitting uplink data in the transmission unit, the receiving end determines the OFDM symbol in which the uplink control is located in the transmission unit as an OFDM symbol adjacent to an OFDM symbol transmitting uplink data in the transmission unit, or the receiving end determines the OFDM symbol in which the uplink control is located in the transmission unit as at least two continuous OFDM symbols starting from an OFDM symbol adjacent to an OFDM symbol transmitting uplink data in the transmission unit.

When multiple beam directions used for transmitting uplink data in the transmission unit exist and a beam direction of the uplink control is the same as at least one of beam directions used for transmitting uplink data in the transmission unit, the receiving end determines the OFDM symbol in which the uplink control is located in the transmission unit as an OFDM symbol adjacent to an OFDM symbol transmitting uplink data in the transmission unit, or the receiving end determines the OFDM symbol in which the uplink control is located in the transmission unit as at least two continuous OFDM symbols starting from an OFDM symbol adjacent to an OFDM symbol transmitting uplink data in the transmission unit.

When a beam direction the same as at least one of beam directions used for transmitting uplink data in the transmission unit exists in PUCCHs of receiving ends of different beam directions, UCI with a beam direction the same as at least one of beam directions transmitting the uplink data is carried in a PUCCH in an OFDM symbol immediately before or after an OFDM symbol transmitting uplink data in the transmission unit, where the OFDM symbol determined by the receiving end, in which the uplink control is located in the transmission unit, is an OFDM symbol adjacent to the OFDM symbol transmitting uplink data in the transmission unit, or the OFDM symbol determined by the receiving end, in which the uplink control is located in the transmission unit, is at least two continuous OFDM symbols starting from an OFDM symbol adjacent to the OFDM symbol transmitting uplink data in the transmission unit.

When multiple uplink controls located in different OFDM symbols exist in the transmission unit and a beam direction of the uplink control is the same as at least one of beams directions used for transmitting uplink data in the transmission unit, the receiving end determines the OFDM symbol in which the uplink control is located in the transmission unit as an OFDM symbol adjacent to an OFDM symbol transmitting uplink data in the transmission unit, or the receiving end determines the OFDM symbol in which the uplink control is located in the transmission unit as at least two continuous OFDM symbols starting from an OFDM symbol adjacent to an OFDM symbol transmitting uplink data in the transmission unit.

When a beam direction of uplink data of the receiving end is different from a beam direction of the uplink control of the receiving end, the receiving end determines the OFDM symbol in which the uplink control is located in the transmission unit as an OFDM symbol adjacent to an OFDM symbol transmitting uplink data in the transmission unit, or the receiving end determines the OFDM symbol in which the uplink control is located in the transmission unit as at least two continuous OFDM symbols starting from an OFDM symbol adjacent to an OFDM symbol transmitting uplink data in the transmission unit.

In an embodiment, before the step 602, at least one of a physical layer signaling or a high-layer signaling is received. The physical layer signaling includes downlink control information. The high-layer signaling includes an RRC message. The high-layer signaling configures a preset location of uplink control in the transmission unit when the physical layer signaling and the high-layer signaling are used simultaneously. The preset location includes an end location of the transmission unit or a location before transmitting uplink data. The physical layer signaling configures an OFDM symbol transmitting the uplink control. The step 602 may include that: according to at least one of the received physical layer signaling or high-layer signaling, the receiving end determines the OFDM symbol in which the uplink control is located in the transmission unit.

In an embodiment, the step 602 may include: when the receiving end transmits uplink data in the transmission unit, automatically adjusting the OFDM symbol in which the uplink control is located to be an OFDM symbol adjacent to an OFDM symbol for transmitting uplink data in the transmission unit, or automatically adjusting the OFDM symbol in which the uplink control is located to be at least two continuous OFDM symbols starting from an OFDM symbol adjacent to an OFDM symbol transmitting uplink data in the transmission unit, where the being continuous includes: being continuous forward or being continuous backward.

In an embodiment, before the step 604, a beam direction used for transmitting uplink control in the OFDM symbol in which the uplink control is located may further be determined; and the step 604 may include: sending the uplink control using the determined beam direction in the determined OFDM symbol.

In an embodiment, the step in which a beam direction used for transmitting uplink control in the OFDM symbol in which the uplink control is located is determined may include: when signaling for informing the receiving end of the beam direction used for transmitting the uplink control in the OFDM symbol in which the uplink control is located is received, determining the beam direction used for transmitting the uplink control in the OFDM symbol in which the uplink control is located as a beam direction indicated in the received signaling; or when signaling for informing the receiving end of the beam direction used for transmitting the uplink control in the OFDM symbol in which the uplink control is located is not received, using by default all or at least one of beam directions used by the receiving end for transmitting uplink data in the transmission unit; or when signaling for informing the receiving end of the beam direction used for transmitting the uplink control in the OFDM symbol in which the uplink control is located is not received, using by default all or at least one of beam directions used for transmitting uplink data or an uplink control in a transmission unit before the transmission unit; or when signaling for informing the receiving end of a beam direction used for sending uplink control in the OFDM symbol in which the uplink control is located in the transmission unit is not received, using by default all or at least one of beam directions used for receiving downlink data in the transmission unit.

In an embodiment, the uplink control meets at least one of: the uplink control occupying at least one OFDM symbol; the uplink control being configured to send ACK/NACK information, CSI, or beam direction information; the uplink control being located in an OFDM symbol at an end of the transmission unit; the uplink control being located in an OFDM symbol before the OFDM symbol transmitting uplink data in the transmission unit; or the uplink control being an area for transmitting a PUCCH, or an area for transmitting UCI.

In an embodiment, the transmission unit may be a subframe, a slot, a mini slot, etc., and the OFDM symbol may be other resource unit of time-frequency resources, which is used for characterizing a resource magnitude.

Figure 7:
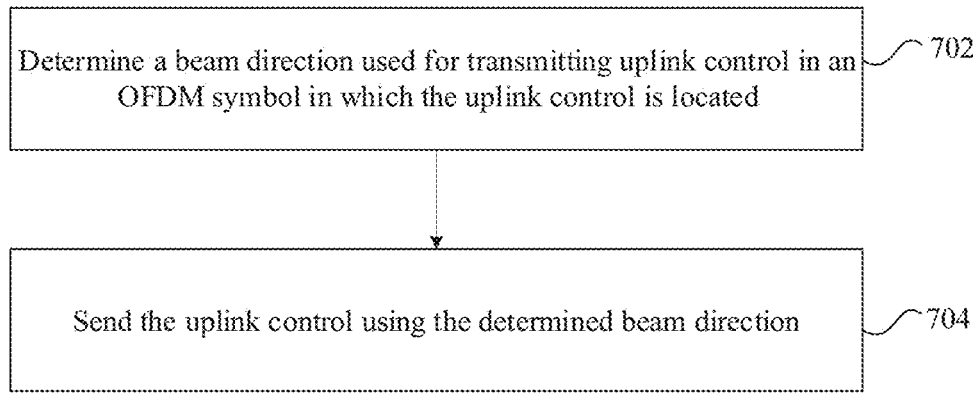
FIG. 7 is a flowchart two of an uplink control sending method according to an embodiment.

An uplink control sending method is further provided in an embodiment. FIG. 7 is a flowchart two of the uplink control sending method according to the embodiment. As shown in FIG. 7, the method includes steps described below.

In step 702, a beam direction used for transmitting an uplink control in an OFDM symbol in which the uplink control is located is determined.

In step 704, the uplink control is sent using the determined beam direction.

Through the above steps, the receiving end determines the beam direction capable of being used for sending uplink control in the OFDM symbol in which the uplink control is located, so that the receiving end can send the uplink control in a range of the beam direction capable of being used, solving problems of complicated processing existing in the configuration manner of locations of OFDM symbols for of uplink controls of receiving ends in the related art, and reducing the uplink control processing complexity.

In an embodiment, the step in which a beam direction used for transmitting uplink control in the OFDM symbol in which the uplink control is located is determined may include: when signaling for informing the receiving end of the beam direction used for transmitting the uplink control in the OFDM symbol in which the uplink control is located is received, determining the beam direction used for transmitting the uplink control in the OFDM symbol in which the uplink control is located as a beam direction indicated in the received signaling; or when signaling for informing the receiving end of the beam direction used for transmitting the uplink control in the OFDM symbol in which the uplink control is located is not received, using by default all or at least one of beam directions used by the receiving end for transmitting uplink data in the transmission unit; or when signaling for informing the receiving end of the beam direction used for transmitting the uplink control in the OFDM symbol in which the uplink control is located is not received, using by default all or at least one of beam directions used for transmitting uplink data or an uplink control in a transmission unit before the transmission unit; or when signaling for informing the receiving end of a beam direction used for sending uplink control in the OFDM symbol in which the uplink control is located in the transmission unit is not received, using by default all or at least one of beam directions used for receiving downlink data in the transmission unit.

In an embodiment, the uplink control meets at least one of: the uplink control occupying at least one OFDM symbol; the uplink control being configured to send ACK/NACK information, CSI, or beam direction information; the uplink control being located in an OFDM symbol at an end of the transmission unit; the uplink control being located in an OFDM symbol before the OFDM symbol transmitting uplink data in the transmission unit; or the uplink control being an area for transmitting a PUCCH, or an area for transmitting UCI.

In an embodiment, the transmission unit may be a subframe, a slot, a mini slot, etc., and the OFDM symbol may be other resource unit of time-frequency resources, which is used for characterizing a resource magnitude.

On the basis of the above examples and embodiments, to explain the entire process interaction of the solution, in an embodiment, an uplink control receiving method and an uplink control sending method are provided. The methods are generally described below.

Figure 8:
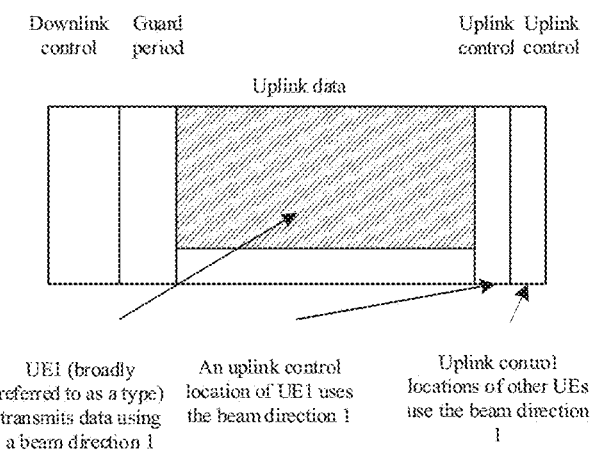
FIG. 8 is a schematic diagram of symbol location configuration of uplink control according to an embodiment.

With reference to FIG. 8, in the embodiment, when a sending end (e.g., which may be a base station, a cell base station, a remote radio unit, etc., and is described using a base station as an example in the embodiment) configures an OFDM symbol location of uplink control (which is described using a PUCCH as an example in the embodiment) for a receiving end (e.g., which may be a UE, a terminal, etc., and is described using a UE as an example in the embodiment) in a transmission unit (e.g., which may be a subframe, a slot, a mini slot, etc., and is described using a slot as an example in the embodiment) (meaning that multiple OFDM symbols for sending different PUCCHs exist in the slot), an OFDM symbol for the UE to transmit data (uplink data) and an OFDM symbol for the UE to send the PUCCH are supposed to be remained continuous, so as to avoid the occurrence of a gap between the OFDM symbol for the UE to transmit data and the OFDM symbol for the UE to send the PUCCH when the OFDM symbol locations of the PUCCHs of the UEs are configured. Such a gap will cause additional complexity during the sending of the UE and the receiving of the base station.

When PUCCHs of multiple beam directions need to be transmitted in one slot, uplink control with a beam direction the same as a beam direction for sending the data in the slot is configured in an OFDM adjacent to the data, so as to remain the sending of UE data and uplink control continuous. If the base station has multiple radio frequency links, different UEs are allowed to send uplink data of multiple different directions in the slot at the same time. When multiple beam directions used for transmitting the data exist in the slot, a PUCCH of the UE, which is consistent with at least one of beam directions used for sending the data in the slot, is placed in an OFDM symbol adjacent to the data.

The uplink control described herein refers to a short PUCCH, i.e., occupying one OFDM symbol in time domain. If subsequently the short PUCCH is defined to occupy multiple OFDM symbols (e.g., 2, 3, etc.), the method provided in the embodiment is still applicable.

For UEs transmitting only the PUCCHs in one slot, the locations of OFDM symbols for these UEs to send the PUCCHs can be configured in OFDM symbols not continuous with an OFDM symbol transmitting the data, or are configured correspondingly according to a beam direction used by an OFDM symbol of each PUCCH.

The uplink control receiving method and the uplink control sending method provided in the embodiment may be applied to location configuration of uplink control. The methods may be generalized as follow.

When one transmission unit includes uplink controls of different receiving ends and they are time-division multiplexed, when the sending end configures an OFDM symbol location of the uplink control for the receiving end in the transmission unit, the continuity should be kept between the OFMD symbol for the receiving end to send uplink data and the OFDM symbol for the receiving end to send uplink control.

In an embodiment, the uplink control meets at least one of: uplink control of one receiving end occupying one or two OFDM symbols; the uplink control being configured to send ACK/NACK information, CSI, or beam direction information; the uplink control being located in an OFDM symbol at an end of the transmission unit; the uplink control being located before transmitting uplink data in the transmission unit; or the uplink control being an area for transmitting a PUCCH, or an area for transmitting UCI.

In an embodiment, keeping the continuity between the OFMD symbol for the receiving end to send uplink data and the OFDM symbol for the receiving end to send uplink control includes: when PUCCHs of multiple beam directions need to be transmitted in one slot, configuring uplink control with a beam direction the same as a beam direction sending the data in the slot in an OFDM adjacent to the data, so as to remain the sending of uplink control and UE data continuous.

In an embodiment, the step in which the continuity between the OFMD symbol for the receiving end to send uplink data and the OFDM symbol for the receiving end to send uplink control is kept includes: if the base station has multiple radio frequency links, allowing different UEs to send uplink data of multiple different directions in the slot at the same time, and when multiple beam directions used for transmitting the data exist in the slot, configuring a PUCCH of the UE, which is consistent with at least one of beam directions used for sending the data in the slot, in an OFDM symbol adjacent to the data; or when a beam direction the same as at least one of beam directions of data transmitted in the slot exists in PUCCHs of UEs of different beam directions, carrying, by the sending end, UCI with a beam direction the same as at least one of beam directions transmitting uplink data in a PUCCH in an OFDM symbol immediately before or after an OFDM symbol transmitting uplink data in the slot; or when PUCCH resources of multiple UEs are located in different OFDM symbols in the slot, configuring, by the sending end, a PUCCH of a UE with a beam direction the same as at least one of beam directions used for transmitting uplink data in the slot in a symbol adjacent to a symbol for transmitting uplink data.

The configured OFDM symbol transmitting the PUCCH is adjacent to an OFDM symbol transmitting uplink data; or, the configured OFDM symbol transmitting the PUCCH is several (e.g., 2, 3, 4, etc.) continuous (including forward continuous or backward continuous) symbols starting from the symbol adjacent to uplink data transmission.

In an embodiment, the step in which the continuity between the OFMD symbol for the receiving end to transmit uplink data and the OFDM symbol for the receiving end to send uplink control is kept includes that: when a beam direction transmitting uplink data and a beam direction transmitting uplink control of the same receiving end are different in one slot, the sending end configures an OFDM symbol of uplink control of the receiving end in an OFDM symbol adjacent to uplink data transmission or in several continuous symbols starting from the OFDM symbol adjacent to uplink data transmission.

In an embodiment, when the sending end configures the OFDM symbol location of the uplink control for the receiving end in the transmission unit, a following step is included: the sending end performs configuration through at least one of a physical layer signaling or a high-layer signaling. The physical layer signaling includes downlink control information. The high-layer signaling includes an RRC message. When the physical layer signaling and the high-layer signaling are used simultaneously, the high-layer signaling configures a relative location (whose function is the same as the function of the foregoing preset location) of uplink control in the slot, including an end location of the slot or a location before transmitting uplink data. The physical layer signaling configures an OFDM symbol for uplink control of receiving end.

In an embodiment, when the sending end configures the OFDM symbol location of the uplink control for the receiving end in the transmission unit, a following step is further included: the sending end implicitly contains or configures a beam direction capable of being used for sending the uplink control in the OFDM symbol in which the uplink control is located in the slot, and sends a signaling to inform the receiving end.

The sending end may only execute: implicitly containing or configuring the beam direction capable of being used for sending the uplink control in the OFDM symbol in which the uplink control is located in the slot, and sending the signaling to inform the receiving end.

In an embodiment, the implicitly containing includes that: when the sending end does not send a signaling to inform the receiving end of the beam direction used for sending the uplink control in the OFDM symbol in which the uplink control is located, the sending end defaults that the receiving end uses all or at least one of beam directions used for transmitting uplink data in the slot; or, when the sending end does not send signaling to inform the receiving end of the beam direction used for sending uplink control in the OFDM symbol in which the uplink control is located, the sending end defaults that the receiving end uses all or at least one of beam directions previously used for transmitting uplink data or an uplink control.

The uplink control receiving method and the uplink control sending method of the embodiment are described below in conjunction with examples.

It is assumed that a base station only has one radio frequency link, that is, the base station receives only one beam direction within one time. It is assumed that UE1, UE2 and UE3 are scheduled to transmit uplink data in a slot, and at this time, the UE1, UE2 and UE3 all have uplink control to transmit in the slot. In addition, UE4 also needs to transmit uplink control in the slot. Therefore, two OFDM symbols at the end of the slot will be used for uplink control (one OFDM symbol corresponds to one uplink control, and if each uplink control occupies two OFDM symbols, then four OFDM symbols at the end of the slot need to be occupied for two uplink controls at this time. It alternatively may be that one uplink control occupies one OFDM symbol, another uplink control occupies two OFDM symbols, and at this time, three OFDM symbols at the end of the slot need to be occupied for two uplink controls). Beam directions of the UE1, the UE2 and the UE3 for sending uplink data and uplink controls are consistent and consistent with each other, which are all a beam direction 1, and a beam direction of the UE4 for sending uplink control is a beam direction 2. Here, since the UE1, the UE2 and the UE3 use the same beam direction to send uplink controls and uplink data in the slot, the uplink controls of the UE1, the UE2 and the UE3 need to be configured in an OFDM symbols adjacent to transmission of uplink data of the UE1, the UE2 and the UE3, that is, the uplink controls of the UE1, the UE2 and the UE3 are configured in a penultimate OFDM symbol in the slot (transmission of uplink data of the UE1, the UE2 and the UE3 terminates at an antepenultimate OFDM symbol). The uplink control of the UE4 is configured in the last OFDM symbol in the slot. In this way, after the UE1, UE2 and UE3 finish sending the uplink data using the beam direction 1, the uplink controls are sent continuously using the beam direction 1, avoiding the occurrence of a gap suspending one OFDM symbol. The UE4 sends the uplink control using the beam direction 2 in the last OFDM symbol.

In addition, if there is UE5, the UE5 only sends the uplink control in the slot and the UE5 uses the beam direction 1. Although the UE5 does not send uplink data in the slot, the beam direction used by the UE5 is the same as the beam direction of the UE1, UE2 and UE3, so that the uplink control of the UE5 is also configured in the penultimate symbol of the slot.

A simultaneous receiving ability of a base station having multiple radio frequency links is illustrated below.

It is assumed that the base station has multiple radio frequency links, and receives eight beam directions simultaneously. It is assumed that UE1 and UE2 are scheduled to send uplink data in a slot, and at this time, the UE1 and UE2 both have uplink control to send in the slot. In addition, UE3 also needs to send uplink control in the slot. In this way, two OFDM symbols at the end of the slot are used for uplink control (one OFDM symbol corresponds to one uplink control, and if each uplink control occupies two OFDM symbols, four OFDM symbols at the end of the slot need to be occupied for two uplink controls. It alternatively may be that one uplink control occupies one OFDM symbol, another uplink control occupies two OFDM symbols, and at this time, three OFDM symbols at the end of the slot need to be occupied for two uplink controls). The UE1 sends the uplink data using the beam direction 1, and the UE2 sends the uplink data using the beam direction 1 and the beam direction 2 (the UE2 has two radio frequency links, and the two radio frequency links simultaneously send uplink data to the base station). In this way, there are two beam directions sending data in the slot. It is assumed that the UE1 sends the uplink control using the beam direction 1, the UE2 sends the uplink control using the beam directions 1 and 2 (sending simultaneously in two beam directions in the same one ODFM symbol is because the UE2 has two radio frequency links), and the UE3 sends the uplink control using the beam direction 2. In this way, since the beam direction used for uplink control of the UE1 and UE2 is the same as at least one of beam directions sending data in the slot, the uplink controls of the UE1 and UE2 are configured in an OFDM symbol adjacent to data sending of the UE1 and UE2. That is, the uplink controls of the UE1 and UE2 are configured in the penultimate OFDM symbol in the slot (sending of the uplink data of the UE1 and UE2 terminates at the antepenultimate OFDM symbol). Since the beam direction used for uplink control of the UE3 is different from beam directions sending data in the slot, the uplink control of the UE3 is configured in the last OFDM symbol in the slot. In this way, after the UE1 finishes sending the uplink data using the beam direction 1, the uplink control is sent continuously using the beam direction 1, avoiding the occurrence of a gap suspending one OFDM symbol. After the UE2 finishes sending the uplink data using the beam directions 1 and 2, the UE2 sends the uplink control continuously using the beam directions 1 and 2, which also avoids the occurrence of a gap suspending one OFDM symbol. The UE3 sends the uplink control using the beam direction 2 in the last OFDM symbol. If the UE1 continuously uses two times of uplink control sending to increase reliability, the UE1 may send the uplink control using the beam direction 1 in the penultimate OFDM symbol, and then sends the uplink control using the beam direction 2 in the last OFDM symbol. At this time, the UE1 still performs sending continuously. Since the uplink control beam direction of the UE1 is the same as at least one of uplink data beam directions, the configuration location of the uplink control of the UE1 also meets the method of the embodiment, at least one time of the uplink controls of the UE1 is configured in a symbol adjacent to uplink data.

In addition, if there is UE5, the UE5 only sends uplink control in the slot and the UE5 uses the beam direction 1. Although the UE5 does not send uplink data in the slot, the beam direction used by the UE5 is the same as the beam direction of the UE1 and UE2, so that the uplink control of the UE5 is also configured in the penultimate symbol of the slot.

Figure 9A:
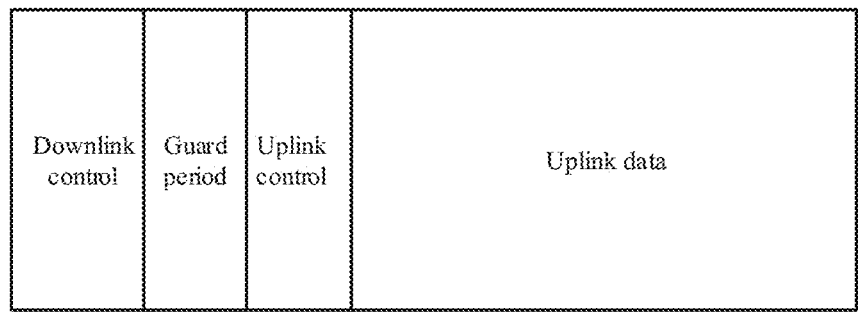
FIG. 9(*a*) is a schematic structure diagram of an uplink transmission unit according to an embodiment.

If the uplink control is placed in the OFDM symbol before the uplink data in the slot, for example in FIG. 9(a), the above information sending method of the embodiment is still suitable.

Several possible implementations are given below according to different description aspects.

Implementation 1

When PUCCHs of UEs of different beam directions exist in a slot, a sending end places the PUCCHs of the UEs of different beam directions according to OFDM symbols, and places OFDM symbols of the PUCCHs of the UEs of different beam directions according to a following rule.

Figure 1:
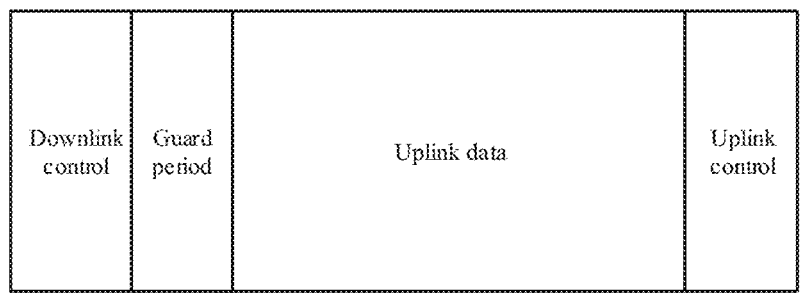
FIG. 1 is a schematic diagram of an uplink transmission unit in the related art.
Figure 2:
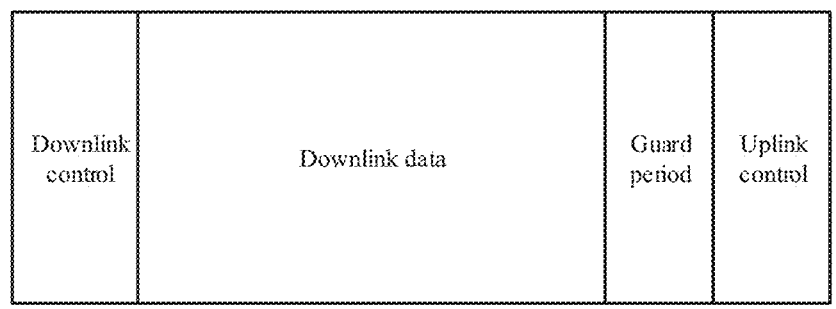
FIG. 2 is a schematic diagram of a downlink transmission unit in the related art.

When a beam direction the same as a beam direction transmitting uplink data in the slot exists in the PUCCHs of the UEs of different beam directions, the sending end places a PUCCH of a UE (e.g., UE1), which has a beam direction the same as the beam direction transmitting uplink data in the slot, in an OFDM symbol adjacent to the transmitted uplink data (the being adjacent herein refers to an OFDM symbol transmitting uplink data being adjacent to an OFDM symbol transmitting uplink control, and the same applies below). Corresponding to FIGS. 1 and 2, when the uplink control is placed at the end of the slot, the PUCCH of the UE1 is placed in an OFDM symbol adjacent to the OFDM symbol transmitting uplink data, or the PUCCH of the UE1 is placed backward starting from an OFDM symbol adjacent to the OFDM symbol transmitting uplink data. Corresponding to FIG. 9(a), when the uplink control is placed before uplink data, the PUCCH of the UE1 is placed in an OFDM symbol adjacent to the OFDM symbol transmitting uplink data, or the PUCCH of the UE1 is placed forward starting from an OFDM symbol adjacent to the OFDM symbol transmitting uplink data. The PUCCH of another UE (e.g., UE2) is placed before (corresponding to FIG. 9(a)) or after (corresponding to FIGS. 1 and 2) the PUCCH of the UE1.

The being the same includes being completely the same and being partly the same. The being partly the same refers to that a beam direction corresponding to the PUCCHs of the UEs of different beam directions is the same as at least one of beam directions transmitting uplink data in the slot. There may be multiple beam directions for transmitting uplink data. For example, a UE having multiple radio frequency links may send data using two or more beam directions simultaneously, and at this time, two or more beam directions sending uplink data may occur. When the UE (which may be at least one of the UE transmitting uplink data in the slot and the other UE) sends the PUCCH, the PUCCH may be sent using multiple beam directions simultaneously, but at least one beam direction of the PUCCH is the same as one beam direction transmitting the data.

The basic principle is still that, in the slot, when the OFDM symbol location of the PUCCH is configured for the UE, continuity should be remained between the OFDM symbol transmitting uplink data and the OFDM symbol sending the PUCCH. Do not let a gap occur between the OFDM symbol of the UE for transmitting uplink data and the OFDM symbol of the UE for sending the PUCCH when the OFDM symbol location of the PUCCH of the UE is configured, since such configuration manner will cause additional complexity when the UE performs the sending and the base station performs the receiving.

Implementation 2

When PUCCHs of UEs of different beam directions exist in a slot, a sending end places the PUCCHs of the UEs of different beam directions according to OFDM symbols, and places OFDM symbols of the PUCCHs of the UEs of different beam directions according to a following rule.

When a beam direction the same as at least one of beam directions of data transmitted in the slot exists in the PUCCHs of the UEs of different beam directions, the sending end carries UCI with a beam direction the same as at least one of beam directions transmitting uplink data in a PUCCH in a symbol immediately before or after the symbol transmitting uplink data in the slot.

Alternatively, when PUCCHs of multiple UEs are located in different OFDM symbols in the slot, the base station places a PUCCH of a UE with a beam direction the same as at least one of beam directions used for transmitting uplink data in the slot in an OFDM symbol adjacent to uplink data transmission (which also may be placed in several continuous symbols starting from the OFDM symbol adjacent to uplink data transmission).

Practical examples 1 and 2 are described below.

In example 1, the base station is a single radio frequency link.

Since the base station is a single radio frequency link, only uplink data of one beam direction is allowed to be transmitted in a slot. In one uplink slot, the base station schedules ten UEs to transmit uplink data (respectively marked as UE 1 to 10), and besides PUCCHs (or UCI, and the same applies below) of the UEs 1 to 10 to be transmitted in the slot, PUCCHs of another twenty UEs (respectively marked as UE 11 to 30) also need to be transmitted. The UEs 11 to 20 transmit the PUCCHs using a beam direction the same as the beam direction transmitting the uplink data in the slot, and the UEs 21 to 30 transmit the PUCCHs using a beam direction different from the beam direction transmitting the uplink data in the slot.

It is assumed that each OFDM symbol can transmit PUCCHs of twenty UEs, and at this time, two OFDM symbols are required in this uplink slot for the PUCCH to transmit PUCCHs of the thirty UEs. In these UEs, beam directions of the PUCCHs of some UEs are the same as the beam direction transmitting uplink data in the slot, and beam directions of the PUCCHs of some UEs are different from the beam direction transmitting uplink data in the slot. At this time, a sending end should carry the PUCCHs of the UEs 1 to 20 in an OFDM symbol adjacent to uplink data transmission in the slot, and carry the PUCCHs of the UEs 21 to 30 in another OFDM symbol.

In this way, the UEs 1 to 10 may directly continue to send their own PUCCHs after the uplink data transmission is finished, until the PUCCH sending is finished, and then stop the sending (herein, the essence is to make the PUCCH of the UE transmitting the uplink data in the slot adjacent to the OFDM symbol of the uplink data of the UE, so that the PUCCH and the uplink data of the UE are continuously sent). The UEs 11 to 20 directly send the PUCCHs in a designated symbol, and the UEs 21 to 30 also directly send the PUCHHs in a designated symbol.

If location of the symbol in which the PUCCHs of the UEs 21 to 30 is exchanged with location of the symbol in which the PUCCHs of the UEs 1 to 20 (carry the PUCCHs of the UEs 21 to 30 in the OFDM symbol adjacent to uplink data transmission in the slot, and carry the PUCCHs of the UEs 1 to 20 in another ODFM symbol), a gap of one symbol is caused between the data sending and the PUCCH sending of the UEs 1 to 20, which causes the UE to frequently turn on and turn off the radio frequency and makes the implementation complicated.

If it is assumed that one symbol carries PUCCHs of ten UEs at most, the PUCCHs of the UEs 1 to 10 are placed in the symbol adjacent to uplink data transmission in the slot, the PUCCHs of the UEs 11 to 20 are placed in an OFDM symbol adjacent to the OFDM symbol in which the PUCCHs of the first ten UEs are placed, and the PUCCHs of the UEs 21 to 30 are placed in an OFDM symbol adjacent to the OMFD symbol in which the PUCCHs of the UEs 11 to 20 are placed (at this time, three symbols exist in the slot to place the PUCCHs of the UEs). In this way, the essence is to place the PUCCHs of the UEs sending uplink data in the slot into the OFDM symbol adjacent to uplink data sending, so that this part of UEs can continue to send their own PUCCHs after the data sending finishes, and the radio frequency does not need to be closed during the process, making UE implementation easy.

In example 2, on the basis of the example 1, it is assumed that a base station has multiple radio frequency links and can receive multiple beam directions simultaneously. At this time, uplink data transmitted in a slot can be in multiple beam directions, as long as the base station can perform receiving in the multiple beam directions simultaneously. At this time, in the UEs 1 to 30, if a beam direction used by the PUCCH of a UE is the same as at least one of beam directions for the UEs 1 to 10 to transmit uplink data in the slot, the PUCCH of the UE with the same beam direction is placed in the OFDM symbol adjacent to uplink data transmission.

Implementation 3

A base station semi-statically configures, for a UE, a location of an OFDM symbol sending a PUCCH (e.g., configuring for the UE through high-layer signaling and an RRC message). For example, the base station configures symbol locations of a PUCCH of a UE in a series of transmission units (e.g., transmission units in a designated periodic interval) for the UE (e.g., for periodical uplink control transmission), and sends configuration information to the UE. Similarly, the UE receives the configuration information, and learns symbol locations of its own uplink control in the series of transmission units. When the above transmission unit is used: 1) if the UE has uplink data in this transmission unit (the uplink data is scheduled by the base station, so the base station knows whether the UE has uplink data in this transmission unit), the base station adjusts by default the symbol of the PUCCH of the UE to be in an OFDM symbol continuous with the uplink data (or multiple OFDM symbols extending forward or backward starting from the OFDM symbol continuous with the uplink data) in the transmission unit, and the base station will receive the uplink control of the UE in the adjusted OFDM symbol; and 2) if the UE has uplink data in this transmission unit (the uplink data is scheduled by the base station, so the base station knows whether the UE has uplink data in this transmission unit), the UE adjusts by default an OFDM symbol of its PUCCH to be in an OFDM symbol continuous with the uplink data (or multiple OFDM symbols extending forward or backward starting from the OFDM symbol continuous with the uplink data) in the transmission unit, and the UE will send the uplink control in the adjusted OFDM symbol.

At this time, through the default dynamic adjustment of the UE and the base station, the symbols of the uplink data and the uplink control of the UE in this transmission unit remain continuous.

Implementation 4

When a system is deployed in an unlicensed carrier, in one transmission unit, a base station and a UE should keep OFDM symbols of uplink data and uplink control of the UE continuous, so as to ensure that the UE continuously performs sending in this transmission unit, and a case that the transmission can be performed only after a use right is preempted by executing a mechanism of Listen Before Talk (LBT) (a rule which a device must perform before transmitting the data using the unlicensed carrier) additionally once is avoided, so as to ensure that the transmission is executed.

Therefore, when the system is deployed on the unlicensed carrier, in one transmission unit, when (short) PUCCHs of different UEs are time division multiplexed, the base station and the UE should keep the OFDM symbol transmitting the uplink data and OFDM symbol transmitting the uplink control information (sent on the PUCCH) continuous. For example, the base station keeps uplink control symbols of the UEs continuous when configuring the uplink control symbols of the UE, or when the base station and the UE have uplink data and uplink control to be sent in the transmission unit at the same time, the symbol of uplink control of the UE and the symbol of uplink data of the UE are defaulted to be continuous.

Implementation 5

In a case that multiple candidate PUCCH resources are configured for a UE in one slot (generally configured through high-layer signaling) and then a specific PUCCH resource (generally configured through physical layer signaling) is selected to be used by the UE in the slot, a base station should configure a part of the multiple candidate PUCCH resources to be located in different OFDM symbols (one candidate PUCCH resource is one PUCCH channel). For example, at least one candidate PUCCH resource is configured to be located in a symbol continuous with an uplink data symbol (or to be continuous forward or backward starting from the symbol continuous with the uplink data symbol).

If in the transmission unit, the base station and the UE find that the UE simultaneously has uplink data and uplink control to be sent, the base station and the UE use by default that candidate PUCCH resource continuous with an OFDM symbol of uplink data as the specific PUCCH resource, or may also indicate the specific PUCCH resource as a certain candidate PUCCH resource continuous with a symbol of uplink data through signaling.

From the perspective of the base station, when the transmission unit includes PUCCH symbols of different UEs for time division multiplexing, when the base station configures the candidate PUCCH resources for the UE, at least one candidate PUCCH is configured within (or starting form) the symbol continuous with uplink data. When the UE has uplink data and uplink control to be sent simultaneously in the transmission unit, the base station indicates or defaults a specific PUCCH resource of the UE in the transmission unit as a certain candidate PUCCH resource or that candidate PUCCH resource continuous with the uplink data symbol through signaling, and receives uplink control of the UE from the specific PUCCH resource.

From the perspective of the UE, the UE receives candidate PUCCH resource configuration information sent by the base station and learns candidate PUCCH resources. When the UE simultaneously has uplink data and uplink control to be sent in the transmission unit, the UE receives indication signaling or defaults the specific PUCCH resource of the UE on this transmission unit as a certain candidate PUCCH resource or that candidate PUCCH resource continuous with the uplink data symbol, and sends the uplink control of the UE via the specific PUCCH resource.

Implementation 6

This implementation provides a beam direction determination method when uplink control is sent, so that a receiving end (e.g., a UE) can use a correct beam direction to send uplink control in an allocated uplink control resource; and a sending end (e.g., a base station) also correspondingly uses a correct beam direction for reception.

The base station configures beam directions, allowed to be used, of OFDM symbols in which different PUCCHs are located in a slot, and sends this configuration information to the UE. The base station uses a corresponding beam direction to perform receiving in the OFDM symbol in which the PUCCH is located.

For example, two short PUCCHs are respectively located two OFDM symbols in the end (which may also be before the uplink data) of the slot, the base station can configure the last OFDM symbol to use the beam direction 1 (herein, which may be multiple beam directions, and if multiple beam directions are used, the base station needs to simultaneously have multiple radio frequency links to perform receiving), and configures the penultimate OFDM symbol to use the beam direction 2. Then, the base station sends configuration signaling to the UE. For example, it may be sent using semi-static high-layer signaling, so that the configuration information is valid for a long time. It may also be sent through physical layer signaling, so that the configuration information can be dynamically changed and adjusted. The UE receives the configuration sent by the base station, learns the beam direction capable of being used by the OFDM symbol of each PUCCH in the slot, and after the UE is configured with an OFDM symbol location of the PUCCH, sends uplink control to the base station using a beam direction used by the OFDM symbol.

For the same OFDM symbol, the UE may use the beam direction 1 to perform sending, but the base station may use the beam direction 1 or the beam direction 2 to perform receiving. The beam direction of the OFDM symbol in which the PUCCH is located sent by the base station to the UE is defined at a UE side, and the beam direction used by the base station to receive a PUCCH of a certain OFDM symbol is defined at the base station side.

Implementation 7

Another solution is given based on the implementation 6.

The base station configures beam directions, allowed to be used, of OFDM symbols in which different PUCCHs are located in the slot, and sends this configuration information to the UE. The base station uses a corresponding beam direction to perform receiving in the OFDM symbol in which the PUCCH is located.

For example, two short PUCCHs are respectively located at two OFDM symbols (which may also be before the uplink data) in the end of the slot, the base station configures its uplink control on the last OFDM symbol for the UE1, and uses the beam direction 1 (herein, which may be multiple beam directions, and if multiple beam directions are used, the base station needs to simultaneously have multiple radio frequency links to perform receiving), and configures its uplink control on the penultimate OFDM symbol for the UE2 and uses the beam direction 2. Then, the base station sends configuration signaling to the UE1 and the UE2. For example, it may be sent using semi-static high-layer signaling, so that the configuration information is valid for a long time. It may also be sent through physical layer signaling, so that the configuration information can be dynamically changed and adjusted.

The UE1 and the UE2 respectively receive the configuration information sent by the base station, and learn their uplink control symbol locations and the used beam directions. The UE1 and the UE2 respectively send uplink control to the base station using the configured beam directions in the configured OFDM symbol locations.

For the same OFDM symbol, the UE may use the beam direction 1 to perform sending, but the base station may use the beam direction 1 or the beam direction 2 to perform receiving. The beam direction of the OFDM symbol in which the PUCCH is located sent by the base station to the UE is defined at the UE side, and the beam direction used by the base station to receive a PUCCH of a certain OFDM symbol is defined at the base station side.

Implementation 8

This embodiment provides a resource allocation method, so as to adapt to the use of high-band beams.

When a base station configures multiple candidate resources for a UE, the multiple candidate resources may be located in OFDM symbols (hereinafter, symbols) of different beam directions, so that when indicating a candidate resource used by the UE, according to beam direction requirement, one candidate resource can be selected as the resource used by the UE from the candidate resources corresponding to a beam direction meeting the requirement.

Figure 9B:
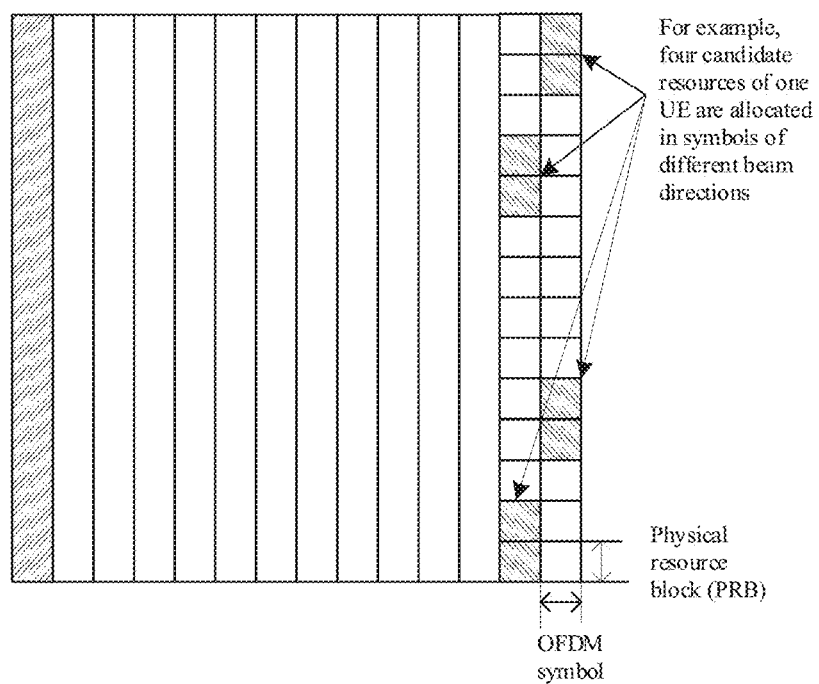

For example, with reference to FIG. 9(b), multiple channel resources (e.g., PUCCH channels) exist in one slot (or one subframe, etc.), and it is assumed herein that each channel resource occupies one OFDM symbol (the principle is the same when each channel resource occupies other numbers of OFDM symbols). For example, in two OFDM symbols at the end of a slot, each symbol has one PUCCH channel, and corresponds to a certain beam direction (alternatively, the two symbols may correspond to the same beam direction). For example, the last symbol corresponds to the beam direction 1, and the penultimate symbol corresponds to the beam direction 2. When the base station configures multiple candidate resources for the UE, the base station may configure a part of candidate resources in the last symbol, corresponding to the beam direction 1, configures a part of candidate resources in the penultimate symbol, corresponding to the beam direction 2, and sends configuration information to the UE (including symbol locations and beam directions of the candidate resources). In the use, the base station selects a suitable candidate resource as a used resource for the UE according to the beam direction of uplink control or uplink data of the UE in the current slot. For example, when the UE needs to use the beam direction 1 in this slot, the base station indicates one of candidate resources in the last symbol as the resource used by the UE. In another example, when the UE needs to use the beam direction 2 in this slot, the base station indicates one of candidate resources in the penultimate symbol as the resource used by the UE.

The UE receives signaling sent by the base station, learning information of the used resource (from multiple candidate resources) and a corresponding symbol location as well as a beam direction, and then sends uplink data using the corresponding beam direction in the used resource.

In this way, since multiple candidate resources are located in symbols of different beam directions, it is helpful for the base station to select the suitable candidate resource as the used resource according to the beam direction requirement of the UE to transmit data. If the base station configures multiple candidate resources in symbols with the same beam direction, the UE cannot obtain used resources of other beam directions when the UE needs these used resources, since the base station does not configure candidate resources of other beam directions.

Implementation 9

A method for indicating an uplink control time domain location is provided in this example. This method has small signaling overhead.

If one UE transmits both uplink data (such as a PUSCH) and uplink control (such as a PUCCH) in a certain slot simultaneously, a base station only indicates an OFDM symbol location of the uplink control of the UE for the UE according to a following rule.

The base station uses dedicated downlink control information (DCI) to indicate the symbol location of the uplink control to a scheduled UE. A slot location does not require a clear signaling indication (thus saving signaling), but a slot location in which a symbol location of uplink control indicated by the base station by default is located is a slot in which the uplink data of the UE is located. The DCI is DCI corresponding to uplink grant information of the UE. The UE receives DCI corresponding to uplink data scheduling, and determines the symbol location of the uplink control. At the same time, the UE defaults that the slot location in which the symbol location of the uplink control is located is the slot in which uplink data of the UE is located.

The multiple embodiments of the present disclosure may be disposed separately, and may also be combined into one embodiment for joint use. Each embodiment is merely the optional implementation of the present disclosure.

From the description of the embodiments described above, it will be apparent to those skilled in the art that the methods in the embodiments described above may be implemented by software plus a necessary general-purpose hardware platform, or may of course be implemented by hardware. Base on such understanding, the present disclosure may be embodied in the form of a software product. The computer software product is stored in a storage medium (such as an ROM)/an RAM, a magnetic disk or an optical disk) and includes several instructions for enabling terminal equipment (which may be a mobile phone, a computer, a server, network equipment or the like) to execute the methods in the embodiments of present disclosure.

Embodiment 2

An uplink control receiving device is provided in an embodiment. The device is configured to implement the above-mentioned embodiments and preferred implementations. What has been described will not be repeated. As used below, the term "module" may be software, hardware or a combination thereof capable of implementing a predetermined function. The device described below in the embodiments is implemented by software, but implementation by hardware or by a combination of software and hardware is also possible and conceived.

Figure 10:
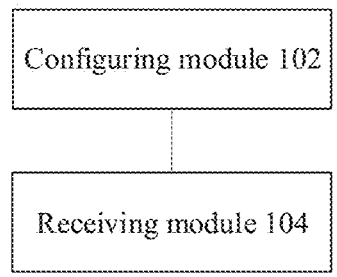
FIG. 10 is a block diagram one of an uplink control receiving device according to an embodiment.

FIG. 10 is a block diagram one of an uplink control receiving device according to an embodiment. As shown in FIG. 10, the device includes a configuring module 102 and a receiving module 104.

The configuring module 102 is configured to configure or specify, for a receiving end, an OFDM symbol for transmitting an uplink control in a transmission unit. The location of an OFDM symbol in which the uplink control is located in the transmission unit and the location of an OFDM symbol in which uplink data is located in the transmission unit remain continuous.

The receiving module 104 is connected to the configuring module 102 and is configured to receive the uplink control from the configured or specified OFDM symbol.

In an embodiment, the configuring module 102 may be further configured to configure or specify respectively, for receiving ends, OFDM symbols for transmitting the uplink controls in the transmission unit according to at least one of beam directions of the receiving ends, a beam direction of the transmission unit or the quantity of radio frequency links of a sending end. The beam direction of the receiving end includes at least one of: a beam direction of uplink data of the receiving end, or a beam direction of uplink control of the receiving end.

The beam direction of the transmission unit includes at least one of: a beam direction used for transmitting uplink data in the transmission unit, or a beam direction used for transmitting uplink control in the transmission unit.

In an embodiment, the configuring module 102 may further be configured to execute at least one of: when uplink controls of multiple beam directions needs to be transmitted in the transmission unit, configuring or specifying an uplink control with a beam direction the same as a beam direction used for transmitting uplink data in the transmission unit in an OFDM symbol adjacent to an OFDM symbol transmitting uplink data in the transmission unit, or configuring or specifying an uplink control with a beam direction the same as a beam direction used for transmitting uplink data in the transmission unit in at least two continuous OFDM symbols starting from an OFDM symbol adjacent to an OFDM symbol transmitting uplink data in the transmission unit; when the sending end has multiple radio frequency links and multiple beam directions transmitting uplink data in the transmission unit exist, configuring or specifying an uplink control with a beam direction the same as at least one of the beam directions used for transmitting uplink data in the transmission unit in an OFDM symbol adjacent to an OFDM symbol transmitting uplink data in the transmission unit, or configuring or specifying an uplink control with a beam direction the same as at least one of the beam directions used for transmitting uplink data in the transmission unit in at least two continuous OFDM symbols starting from an OFDM symbol adjacent to an OFDM symbol transmitting uplink data in the transmission unit; when a beam direction the same as at least one of beam directions used for transmitting uplink data in the transmission unit exists in PUCCHs of receiving ends of different beam directions, carrying UCI with a beam direction the same as at least one of beam directions transmitting the uplink data in a PUCCH in an OFDM symbol immediately before or after an OFDM symbol transmitting uplink data in the transmission unit, where a configured or specified OFDM symbol transmitting a PUCCH is an OFDM symbol adjacent to the OFDM symbol transmitting uplink data in the transmission unit, or a configured or specified OFDM symbol transmitting a PUCCH is at least two continuous OFDM symbols starting from an OFDM symbol adjacent to the OFDM symbol transmitting uplink data in the transmission unit; when multiple uplink controls located in different OFDM symbols exist in the transmission unit, configuring or specifying an uplink control with a beam direction the same as at least one of beam directions transmitting uplink data in the transmission unit in an OFDM symbol adjacent to an OFDM symbol transmitting uplink data in the transmission unit, or configuring or specifying an uplink control with a beam direction the same as at least one of beam directions transmitting uplink data in the transmission unit in at least two continuous OFDM symbols starting from an OFDM symbol adjacent to an OFDM symbol transmitting uplink data in the transmission unit; or when a beam direction of uplink data and a beam direction of uplink control of the same receiving end in a transmission unit are different, configuring or specifying the uplink control of the receiving end with the beam direction of uplink data different from the beam direction of uplink control in an OFDM symbol adjacent to an OFDM symbol transmitting uplink data in the transmission unit, or configuring or specifying the uplink control of the receiving end with the beam direction of uplink data different from the beam direction of uplink control in at least two continuous OFDM symbols starting from an OFDM symbol adjacent to an OFDM symbol transmitting uplink data in the transmission unit.

In an embodiment, the configuring module 102 may be further configured to perform configuration through at least one of a physical layer signaling or a high-layer signaling. The physical layer signaling includes downlink control information. The high-layer signaling includes an RRC massage. When the physical layer signaling and the high-layer signaling are used simultaneously, the high-layer signaling configures a preset location of uplink control in the transmission unit. The preset location includes an end location of the transmission unit or a location before transmitting uplink data. The physical layer signaling configures an OFDM symbol transmitting the uplink control.

In an embodiment, the device may further include a sending module. The configuring module 102 may be further configured to configure or specify a beam direction capable of being used for sending uplink control in an OFDM symbol in which uplink control is located in the transmission unit. The sending module may be configured to, when the beam direction capable of being used for sending the uplink control in the OFDM symbol in which the uplink control is located in the transmission unit is configured, send a signaling to inform the receiving end.

In an embodiment, the configuring module 102 may further be configured to: when signaling for informing the beam direction used for sending the uplink control in the OFDM symbol in which the uplink control is located is not sent, default the beam direction capable of being used by the receiving end for sending the uplink control as all or at least one of beam directions used for transmitting uplink data in the transmission unit; or when signaling for informing the beam direction used for sending the uplink control in the OFDM symbol in which the uplink control is located is not sent, default the beam direction capable of being used by the receiving end for sending the uplink control as all or at least one of beam directions used for transmitting uplink data or an uplink control in a transmission unit before the transmission unit; or when signaling for informing the beam direction used for sending the uplink control in the OFDM symbol in which the uplink control is located is not sent, default the beam direction capable of being used by the receiving end for sending the uplink control as all or at least one of beam directions used for receiving downlink data in the transmission unit.

Figure 11:
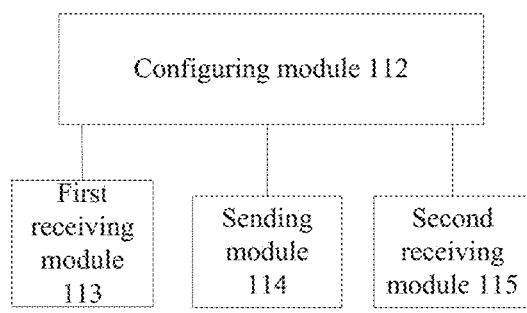
FIG. 11 is a block diagram two of an uplink control receiving device according to an embodiment.

An uplink control receiving device is further provided in an embodiment. FIG. 11 is a block diagram two of the uplink control receiving device according to the embodiment. As shown in FIG. 11, the device includes a configuring module 112, a first receiving module 113, a sending module 114 and a second receiving module 115.

The configuring module 112 is configured to configure or specify a beam direction capable of being used for sending an uplink control in an OFDM symbol in which the uplink control is located in a transmission unit.

The first receiving module 113 is configured to receive the uplink control according to the specified beam direction used by the uplink control.

Alternatively, the configuring module 112 is configured to configure a beam direction used for sending an uplink control in an OFDM symbol in which the uplink control is located in a transmission unit.

The sending module 114 is connected to the configuring module 112 and is configured to, when the beam direction capable of being used for sending the uplink control in the OFDM symbol in which the uplink control is located in the transmission unit is configured, send a signaling to inform a receiving end.

The second receiving module 115 is configured to receive the uplink control according to the configured beam direction used by the uplink control.

In an embodiment, the configuring module 112 may further be configured to: when signaling for informing the beam direction used for sending the uplink control in the OFDM symbol in which the uplink control is located in the transmission unit is not sent, default the beam direction capable of being used by the receiving end for sending the uplink control as all or at least one of beam directions used for transmitting uplink data in the transmission unit; or when signaling for informing the beam direction used for sending the uplink control in the OFDM symbol in which the uplink control is located in the transmission unit is not sent, default the beam direction capable of being used by the receiving end for transmitting the uplink control as all or at least one of beam directions used for transmitting uplink data or an uplink control in a transmission unit before the transmission unit; or when signaling for informing the beam direction used for transmitting the uplink control in the OFDM symbol in which the uplink control is located in the transmission unit is not sent, default the beam direction capable of being used by the receiving end for transmitting the uplink control as all or at least one of beam directions used for receiving downlink data in the transmission unit.

An uplink control sending device is further provided in an embodiment. The device is configured to implement the above-mentioned embodiments and preferred implementations.

Figure 12:
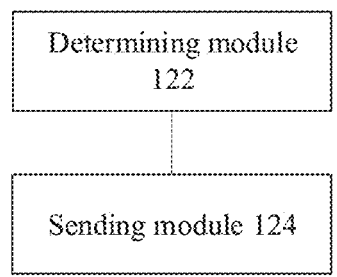
FIG. 12 is a block diagram one of an uplink control sending device according to an embodiment.

FIG. 12 is a block diagram one of an uplink control sending device according to an embodiment. As shown in FIG. 12, the device includes a determining module 122 and a sending module 124.

The determining module 122 is configured to determine an OFDM symbol in which an uplink control of a receiving end is located in a transmission unit.

The sending module 124 is connected to the determining module 122 and is configured to send the uplink control in the determined OFDM symbol.

In an embodiment, the determining module 122 may further be configured to execute at least one of: when a beam direction of the uplink control is the same as a beam direction used for transmitting uplink data in the transmission unit, determining, by the receiving end, the OFDM symbol in which the uplink control is located in the transmission unit as an OFDM symbol adjacent to an OFDM symbol transmitting uplink data in the transmission unit, or determining, by the receiving end, the OFDM symbol in which the uplink control is located in the transmission unit as at least two continuous OFDM symbols starting from an OFDM symbol adjacent to an OFDM symbol transmitting uplink data in the transmission unit; when multiple beam directions used for transmitting uplink data in the transmission unit exist and a beam direction of the uplink control is the same as at least one of beam directions used for transmitting uplink data in the transmission unit, determining, by the receiving end, the OFDM symbol in which the uplink control is located in the transmission unit as an OFDM symbol adjacent to an OFDM symbol transmitting uplink data in the transmission unit, or determining, by the receiving end, the OFDM symbol in which the uplink control is located in the transmission unit as at least two continuous OFDM symbols starting from an OFDM symbol adjacent to an OFDM symbol transmitting uplink data in the transmission unit; when a beam direction the same as at least one of beam directions used for transmitting uplink data in the transmission unit exists in a PUCCHs of the receiving ends of different beam directions, carrying UCI with a beam direction the same as at least one of beam directions transmitting the uplink data in a PUCCH in an OFDM symbol immediately before or after an OFDM symbol transmitting uplink data in the transmission unit, where the OFDM symbol determined by the receiving end, in which the uplink control is located in the transmission unit, is an OFDM symbol adjacent to the OFDM symbol transmitting uplink data in the transmission unit, or the OFDM symbol determined by the receiving end, in which the uplink control is located in the transmission unit, is at least two continuous OFDM symbols starting from an OFDM symbol adjacent to the OFDM symbol transmitting uplink data in the transmission unit; when multiple uplink controls located in different OFDM symbols exist in the transmission unit and a beam direction of the uplink control is the same as at least one of beams directions used for transmitting uplink data in the transmission unit, determining, by the receiving end, the OFDM symbol in which the uplink control is located in the transmission unit as an OFDM symbol adjacent to an OFDM symbol transmitting uplink data in the transmission unit, or determining, by the receiving end, the OFDM symbol in which the uplink control is located in the transmission unit as at least two continuous OFDM symbols starting from an OFDM symbol adjacent to an OFDM symbol transmitting uplink data in the transmission unit; or, when a beam direction of uplink data of the receiving end is different from a beam direction of the uplink control of the receiving end, determining, by the receiving end, the OFDM symbol in which the uplink control is located in the transmission unit as an OFDM symbol adjacent to an OFDM symbol transmitting uplink data in the transmission unit, or determining, by the receiving end, the OFDM symbol in which the uplink control is located in the transmission unit as at least two continuous OFDM symbols starting from an OFDM symbol adjacent to an OFDM symbol transmitting uplink data in the transmission unit.

In an embodiment, the device may further include a receiving module. The receiving module may be configured to receive at least one of a physical layer signaling or a high-layer signaling. The physical layer signaling includes downlink control information. The high-layer signaling includes an RRC message. When the physical layer signaling and the high-layer signaling are used simultaneously, the high-layer signaling configures a preset location of uplink control in the transmission unit. The preset location includes an end location of the transmission unit or a location before transmitting uplink data. The physical layer signaling configures an OFDM symbol transmitting the uplink control. The determining module 122 may further be configured to determine, by the receiving end, the OFDM symbol in which the uplink control is located in the transmission unit according to the received physical layer signaling and/or high-layer signaling.

In an embodiment, the determining module 122 may further be configured to, when the receiving end transmits uplink data in the transmission unit, automatically adjust the OFDM symbol in which the uplink control is located to be an OFDM symbol adjacent to an OFDM symbol for transmitting uplink data in the transmission unit, or automatically adjust the OFDM symbol in which the uplink control is located to be at least two continuous OFDM symbols starting from an OFDM symbol adjacent to an OFDM symbol transmitting uplink data in the transmission unit. The being continuous includes being continuous forward or being continuous backward.

In an embodiment, the determining module 122 may further be configured to determine a beam direction used for transmitting the uplink control in the OFDM symbol in which the uplink control is located, and the sending module 124 may further be configured to send the uplink control using the determined beam direction in the determined OFDM symbol.

In an embodiment, the determining module 122 may further be configured to, when signaling for informing the beam direction used for transmitting the uplink control in the OFDM symbol in which the uplink control is located is received, determine the beam direction used for transmitting the uplink control in the OFDM symbol in which the uplink control is located as a beam direction indicated in the received signaling; or when signaling for informing the beam direction used for transmitting the uplink control in the OFDM symbol in which the uplink control is located is not received, use by default all or at least one of beam directions used for transmitting uplink data in the transmission unit; or when signaling for informing the beam direction used for transmitting the uplink control in the OFDM symbol in which the uplink control is located is not received, use by default all or at least one of beam directions used for transmitting uplink data or an uplink control in a transmission unit before the transmission unit; or when signaling for informing a beam direction used for sending uplink control in the OFDM symbol in which the uplink control is located in the transmission unit is not received, use by default all or at least one of beam directions used for receiving downlink data in the transmission unit.

Figure 13:
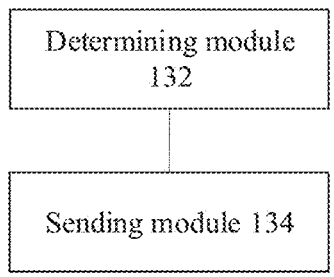
FIG. 13 is a block diagram two of an uplink control sending device according to an embodiment.

An uplink control sending device is further provided in an embodiment. FIG. 13 is a block diagram two of the uplink control sending device according to the embodiment. As shown in FIG. 13, the device includes a determining module 132 and a sending module 134.

The determining module 132 is configured to determine a beam direction used for transmitting an uplink control in an OFDM symbol in which the uplink control is located.

The sending module 134 is connected to the determining module 132 and is configured to send the uplink control using the determined beam direction.

In an embodiment, the determining module 132 may further be configured to, when signaling for informing the beam direction used for transmitting the uplink control in the OFDM symbol in which the uplink control is located is received, determine the beam direction used for transmitting the uplink control in the OFDM symbol in which the uplink control is located as a beam direction indicated in the received signaling; or when signaling for informing the beam direction used for transmitting the uplink control in the OFDM symbol in which the uplink control is located is not received, use by default all or at least one of beam directions used for transmitting uplink data in a transmission unit; or when signaling for informing the beam direction used for transmitting the uplink control in the OFDM symbol in which the uplink control is located is not received, use by default all or at least one of beam directions used for transmitting uplink data or an uplink control in a transmission unit before the transmission unit; or when signaling for informing a beam direction used for sending uplink control in the OFDM symbol in which the uplink control is located in the transmission unit is not received, use by default all or at least one of beam directions used for receiving downlink data in the transmission unit.

It is to be noted that the various modules described above may be implemented by software or hardware. Implementation by hardware may be performed in the following manners: the various modules described above are located in a same processor, or the various modules described above are located in their respective processors in any combination form.

Embodiment 3

A base station, a UE and a wireless communication system are provided in am embodiment. The base station, UE and wireless communication system may be configured to implement the above-mentioned embodiments and preferred embodiments. What has been described will not be repeated. The device (a base station or a UE) in the embodiments described below is preferably implemented by software, but implementation by hardware or by a combination of software and hardware is also possible and conceived.

Figure 14:
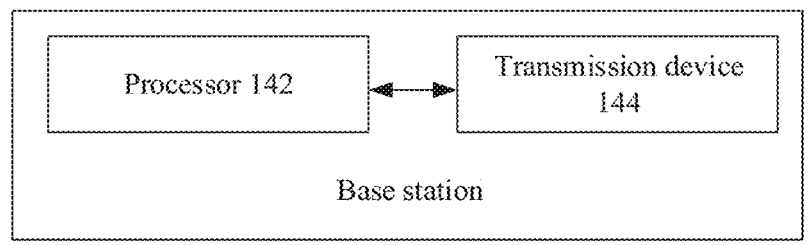
FIG. 14 is a block diagram one of a base station according to an embodiment.

FIG. 14 is a block diagram one of a base station according to an embodiment. As shown in FIG. 14, the base station includes a processor 142 and a transmission device 144.

The processor 142 is configured to configure or specify, for a receiving end, an OFDM symbol for transmitting uplink control in a transmission unit. The location of an OFDM symbol in which the uplink control is located in the transmission unit and the location of an OFDM symbol in which uplink data is located in the transmission unit remain continuous.

The transmission apparatus 144 is connected to the processor 142 and is configured to receive the uplink control from the configured or specified OFDM symbol.

In an embodiment, the processor 142 may further be configured to execute at least one of: when uplink controls of multiple beam directions needs to be transmitted in the transmission unit, configuring or specifying an uplink control with a beam direction the same as a beam direction used for transmitting uplink data in the transmission unit in an OFDM symbol adjacent to an OFDM symbol transmitting uplink data in the transmission unit, or configuring or specifying an uplink control with a beam direction the same as a beam direction used for transmitting uplink data in the transmission unit in at least two continuous OFDM symbols starting from an OFDM symbol adjacent to an OFDM symbol transmitting uplink data in the transmission unit; when the sending end has multiple radio frequency links and multiple beam directions transmitting uplink data in the transmission unit exist, configuring or specifying an uplink control with a beam direction the same as at least one of beam directions used for transmitting uplink data in the transmission unit in an OFDM symbol adjacent to an OFDM symbol transmitting uplink data in the transmission unit, or configuring or specifying an uplink control with a beam direction the same as at least one of beam directions used for transmitting uplink data in the transmission unit in at least two continuous OFDM symbols starting from an OFDM symbol adjacent to an OFDM symbol transmitting uplink data in the transmission unit; when a beam direction the same as at least one of beam directions used for transmitting uplink data in the transmission unit exists in PUCCHs of receiving ends of different beam directions, carrying UCI with a beam direction the same as at least one of beam directions transmitting the uplink data in a PUCCH in an OFDM symbol immediately before or after an OFDM symbol transmitting uplink data in the transmission unit, where a configured or specified OFDM symbol transmitting a PUCCH is an OFDM symbol adjacent to the OFDM symbol transmitting uplink data in the transmission unit, or a configured or specified OFDM symbol transmitting a PUCCH is at least two continuous OFDM symbols starting from an OFDM symbol adjacent to the OFDM symbol transmitting uplink data in the transmission unit; when multiple uplink controls located in different OFDM symbols exist in the transmission unit, configuring or specifying an uplink control with a beam direction the same as at least one of beam directions transmitting uplink data in the transmission unit in an OFDM symbol adjacent to an OFDM symbol transmitting uplink data in the transmission unit, or configuring or specifying an uplink control with a beam direction the same as at least one of beam directions transmitting uplink data in the transmission unit in at least two continuous OFDM symbols starting from an OFDM symbol adjacent to an OFDM symbol transmitting uplink data in the transmission unit; or when a beam direction of uplink data and a beam direction of uplink control of the same receiving end in a transmission unit are different, configuring or specifying the uplink control of the receiving end with the beam direction of uplink data different from the beam direction of uplink control in an OFDM symbol adjacent to an OFDM symbol transmitting uplink data in the transmission unit, or configuring or specifying the uplink control of the receiving end with the beam direction of uplink data different from the beam direction of uplink control in at least two continuous OFDM symbols starting from an OFDM symbol adjacent to an OFDM symbol transmitting uplink data in the transmission unit.

In an embodiment, the processor 142 may be further configured to perform configuration through at least one of a physical layer signaling or a high-layer signaling. The physical layer signaling includes downlink control information. The high-layer signaling includes an RRC massage. When the physical layer signaling and the high-layer signaling are used simultaneously, the high-layer signaling configures a preset location of uplink control in the transmission unit. The preset location includes an end location of the transmission unit or a location before transmitting uplink data. The physical layer signaling configures an OFDM symbol transmitting the uplink control.

Figure 15:
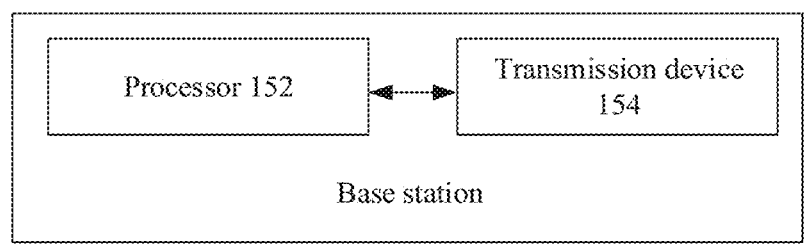
FIG. 15 is a block diagram two of a base station according to an embodiment.

FIG. 15 is a block diagram two of a base station according to an embodiment. As shown in FIG. 15, the base station includes a processor 152 and a transmission device 154.

The processor 152 is configured to configure or specify a beam direction capable of being used for sending an uplink control in an OFDM symbol in which the uplink control is located in a transmission unit.

The transmission apparatus 154 is configured to receive the uplink control according to the specified beam direction used by the uplink control.

Alternatively, the processor 152 is configured to configure a beam direction used for sending an uplink control in an OFDM symbol in which the uplink control is located in a transmission unit.

The transmission apparatus 154 is connected to the processor 152 and is configured to, when the beam direction capable of being used for sending the uplink control in the OFDM symbol in which the uplink control is located in the transmission unit is configured, send a signaling to inform a receiving end, and receive the uplink control according to the configured beam direction used by the uplink control.

In an embodiment, the processor 152 may further be configured to: when signaling for informing the beam direction used for sending the uplink control in the OFDM symbol in which the uplink control is located in the transmission unit is not sent, default the beam direction capable of being used by the receiving end for sending the uplink control as all or at least one of beam directions used for transmitting uplink data in the transmission unit; or when signaling for informing the beam direction used for sending the uplink control in the OFDM symbol in which the uplink control is located in the transmission unit is not sent, default the beam direction capable of being used by the receiving end for transmitting the uplink control as all or at least one of beam directions used for transmitting uplink data or uplink control in a transmission unit before the transmission unit; or when signaling for informing the beam direction used for transmitting the uplink control in the OFDM symbol in which the uplink control is located in the transmission unit is not sent, default the beam direction capable of being used by the receiving end for transmitting the uplink control as all or at least one of beam directions used for receiving downlink data in the transmission unit.

Figure 16:
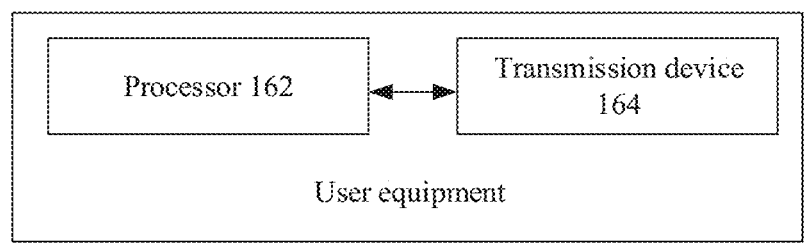
FIG. 16 is a block diagram one of a user equipment according to an embodiment.

FIG. 16 is a block diagram one of a UE according to an embodiment. As shown in FIG. 16, the UE includes a processor 162 and a transmission device 164.

The processor 162 is configured to determine an OFDM symbol in which an uplink control of a UE is located in a transmission unit.

The transmission apparatus 164 is connected to the processor 162 and is configured to send the uplink control in the determined OFDM symbol.

In an embodiment, the processor 162 may further be configured to execute at least one of: when a beam direction of the uplink control is the same as a beam direction used for transmitting uplink data in the transmission unit, determine, by the UE, the OFDM symbol in which the uplink control is located in the transmission unit as an OFDM symbol adjacent to an OFDM symbol transmitting uplink data in the transmission unit, or determine, by the UE, the OFDM symbol in which the uplink control is located in the transmission unit as at least two continuous OFDM symbols starting from an OFDM symbol adjacent to an OFDM symbol transmitting uplink data in the transmission unit; when multiple beam directions used for transmitting uplink data in the transmission unit exist and a beam direction of the uplink control is the same as at least one of beam directions used for transmitting uplink data in the transmission unit, determine, by the UE, the OFDM symbol in which the uplink control is located in the transmission unit as an OFDM symbol adjacent to an OFDM symbol transmitting uplink data in the transmission unit, or determine, by the UE, the OFDM symbol in which the uplink control is located in the transmission unit as at least two continuous OFDM symbols starting from an OFDM symbol adjacent to an OFDM symbol transmitting uplink data in the transmission unit; when a beam direction the same as at least one of beam directions used for transmitting uplink data in the transmission unit exists in a PUCCH of the UE, carry UCI with a beam direction the same as at least one of beam directions transmitting the uplink data in a PUCCH in an OFDM symbol immediately before or after an OFDM symbol transmitting uplink data in the transmission unit, where the OFDM symbol determined by the UE, in which the uplink control is located in the transmission unit, is an OFDM symbol adjacent to the OFDM symbol transmitting uplink data in the transmission unit, or the OFDM symbol determined by the UE, in which the uplink control is located in the transmission unit, is at least two continuous OFDM symbols starting from an OFDM symbol adjacent to the OFDM symbol transmitting uplink data in the transmission unit; or when multiple uplink controls located in different OFDM symbols exist in the transmission unit and a beam direction of the uplink control is the same as at least one of beams directions used for transmitting uplink data in the transmission unit, determine, by the UE, the OFDM symbol in which the uplink control is located in the transmission unit as an OFDM symbol adjacent to an OFDM symbol transmitting uplink data in the transmission unit, or determine, by the UE, the OFDM symbol in which the uplink control is located in the transmission unit as at least two continuous OFDM symbols starting from an OFDM symbol adjacent to an OFDM symbol transmitting uplink data in the transmission unit; or, when a beam direction of uplink data of the UE is different from a beam direction of the uplink control of the UE, determine, by the UE, the OFDM symbol in which the uplink control is located in the transmission unit as an OFDM symbol adjacent to an OFDM symbol transmitting uplink data in the transmission unit, or determine, by the UE, the OFDM symbol in which the uplink control is located in the transmission unit as at least two continuous OFDM symbols starting from an OFDM symbol adjacent to an OFDM symbol transmitting uplink data in the transmission unit.

In an embodiment, the transmission device 164 may further be configured to receive at least one of a physical layer signaling or a high-layer signaling. The physical layer signaling includes downlink control information. The high-layer signaling includes an RRC message. When the physical layer signaling and the high-layer signaling are used simultaneously, the high-layer signaling configures a preset location of uplink control in the transmission unit. The preset location includes an end location of the transmission unit or a location before transmitting uplink data. The physical layer signaling configures the OFDM symbol transmitting the uplink control. The processor 162 may further be configured to, according to at least one of the received physical layer signaling or high-layer signaling, determine, by the UE, the OFDM symbol in which the uplink control is located in the transmission unit.

In an embodiment, the processor 162 may further configured to, when the receiving end transmits uplink data in the transmission unit, automatically adjust the OFDM symbol in which the uplink control is located to be an OFDM symbol adjacent to an OFDM symbol for transmitting uplink data in the transmission unit, or automatically adjust the OFDM symbol in which the uplink control is located to be at least two continuous OFDM symbols starting from an OFDM symbol adjacent to an OFDM symbol transmitting uplink data in the transmission unit. The being continuous includes being continuous forward or being continuous backward.

Figure 17:
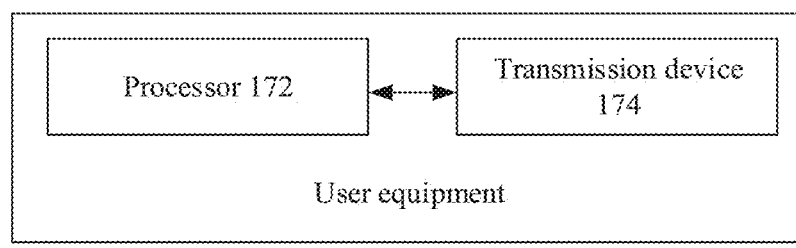
FIG. 17 is a block diagram two of a user equipment according to an embodiment.

FIG. 17 is a block diagram two of a UE according to an embodiment. As shown in FIG. 17, the UE includes a processor 172 and a transmission device 174.

The processor 172 is configured to determine a beam direction used for transmitting an uplink control in an OFDM symbol in which the uplink control is located.

The transmission apparatus 174 is connected to the processor 172 and is configured to send the uplink control using the determined beam direction.

In an embodiment, the processor 172 may further be configured to, when signaling for informing the beam direction used for transmitting the uplink control in the OFDM symbol in which the uplink control is located is received, determine the beam direction used for transmitting the uplink control in the OFDM symbol in which the uplink control is located as a beam direction indicated in the received signaling; or when signaling for informing the beam direction used for transmitting the uplink control in the OFDM symbol in which the uplink control is located is not received, use by default all or at least one of beam directions used for transmitting uplink data in a transmission unit; or when signaling for informing the beam direction used for transmitting the uplink control in the OFDM symbol in which the uplink control is located is not received, use by default all or at least one of beam directions used for transmitting uplink data or uplink control in a transmission unit before the transmission unit; or when signaling for informing a beam direction used for sending uplink control in the OFDM symbol in which the uplink control is located in the transmission unit is not received, use by default all or at least one of beam directions used for receiving downlink data in the transmission unit.

Figure 18:
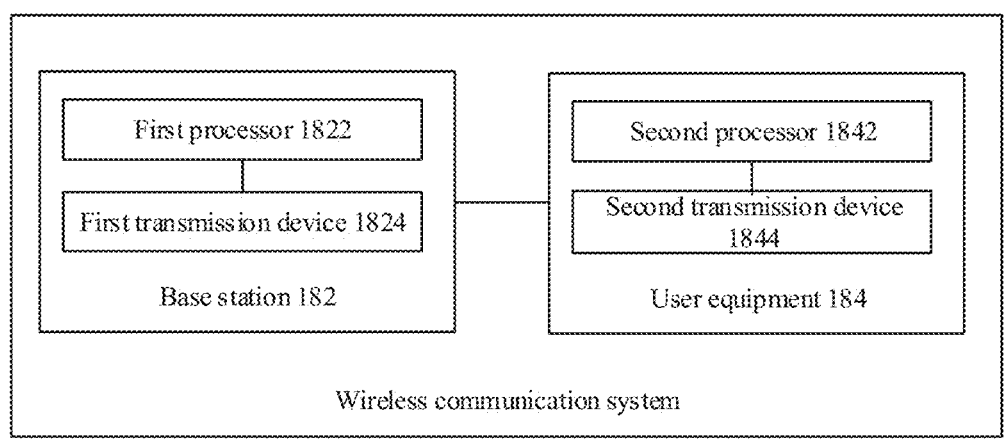
FIG. 18 is a block diagram of a wireless communication system according to an embodiment.

FIG. 18 is a block diagram of a wireless communication system according to an embodiment. As shown in FIG. 18, the wireless communication system includes a base station 182 and a UE 184. The base station 182 includes a first processor 1822 and a first transmission device 1824. The UE 184 includes a second processor 1842 and a second transmission device 1844.

The first processor 1822 is configured to configure or specify, for a UE, an OFDM symbol for transmitting uplink control in a transmission unit. The location of an OFDM symbol in which the uplink control is located in the transmission unit and the location of an OFDM symbol in which uplink data is located in the transmission unit remain continuous.

The transmission device 1824 is connected to the first processor 1822 and is configured to receive the uplink control from the configured or specified OFDM symbol.

The second processor 1842 is configured to determine an OFDM symbol in which uplink control of the UE is located in the transmission unit.

The second transmission device 1844 is connected to the second processor 1842 and the first transmission device 1824, and is configured to send the uplink control in the determined OFDM symbol.

In an embodiment, the first processor 1822 may further be configured to specify a beam direction capable of being used for sending an uplink control in an OFDM symbol in which the uplink control is located in the transmission unit.

The first transmission device 1824 is further configured to receive the uplink control according to the specified beam direction used by the uplink control.

Alternatively, the first processor 1882 may further be configured to configure the beam direction used for sending an uplink control in the OFDM symbol in which the uplink control is located in the transmission unit.

The first transmission apparatus 1824 may further be configured to, when the beam direction capable of being used for sending the uplink control in the OFDM symbol in which the uplink control is located in the transmission unit is configured, send signaling to inform the user equipment, and receive the uplink control according to the configured beam direction used by the uplink control.

The second transmission device 1884 may further be configured to receive at least one of a physical layer signaling or a high-layer signaling.

The processor 1842 may further be configured to determine, by the UE, the OFDM symbol in which the uplink control is located in the transmission unit according to at least one of the received physical layer signaling or high-layer signaling.

In an embodiment, the first processor 1822 may further be configured to configure or specify a beam direction capable of being used for sending an uplink control in an OFDM symbol in which the uplink control is located in the transmission unit.

The first transmission device 1824 is further configured to receive the uplink control according to the specified beam direction used by the uplink control.

Alternatively, the first processor 1882 is further configured to configure the beam direction used for sending an uplink control in the OFDM symbol in which the uplink control is located in the transmission unit.

The first transmission device 1824 may further be configured to, when the beam direction capable of being used for sending the uplink control in the OFDM symbol in which the uplink control is located in the transmission unit is configured, send a signaling to inform the user equipment, and receive the uplink control according to the configured beam direction used by the uplink control.

The second processor 1842 may further be configured to determine the beam direction used for transmitting the uplink control in the OFDM symbol in which the uplink control is located.

The second transmission device 1884 may further be configured to send the uplink control using the determined beam direction in the determined OFDM symbol.

Embodiment 4

A storage medium is provided in an embodiment. In the embodiment, the storage medium may be configured to store program codes for executing steps described below.

In S1, an OFDM symbol for transmitting an uplink control is configured or specified for a receiving end in a transmission unit. The location of an OFDM symbol in which the uplink control is located in the transmission unit and the location of an OFDM symbol in which uplink data is located in the transmission unit remain continuous.

In S2, the uplink control is received from the configured or specified OFDM symbol.

In an embodiment, the storage medium is further configured to store program codes for executing steps described below.

The step in which OFDM symbols for transmitting the uplink control are respectively configured or specified for the receiving end in the transmission unit includes a step described below.

OFDM symbols for transmitting uplink controls are respectively configured or specified for receiving ends in the transmission unit according to at least one of beam directions of the receiving ends, a beam direction of the transmitting end or the quantity of radio frequency links owned by the sending end. The beam direction of the receiving end includes at least one of: a beam direction of uplink data of the receiving end, or a beam direction of uplink control of the receiving end. The beam direction of the transmission unit includes at least one of: a beam direction used for transmitting uplink data in the transmission unit, or a beam direction used for transmitting uplink control in the transmission unit.

In an embodiment, the storage medium is further configured to store program codes for executing a step described below.

The step in which OFDM symbols for transmitting the uplink controls are respectively configured or specified for the receiving ends in the transmission unit includes at least one of steps described below.

In S1, when uplink controls of multiple beam directions needs to be transmitted in the transmission unit, an uplink control with a beam direction the same as a beam direction used for transmitting uplink data in the transmission unit is configured or specified in an OFDM symbol adjacent to an OFDM symbol transmitting uplink data in the transmission unit, or is configured or specified in at least two continuous OFDM symbols starting from an OFDM symbol adjacent to an OFDM symbol transmitting uplink data in the transmission unit.

In S2, when the sending end has multiple radio frequency links and multiple beam directions transmitting uplink data in the transmission unit exist, an uplink control with a beam direction the same as at least one of beam directions used for transmitting uplink data in the transmission unit is configured or specified in an OFDM symbol adjacent to an OFDM symbol transmitting uplink data in the transmission unit, or is configured or specified in at least two continuous OFDM symbols starting from an OFDM symbol adjacent to an OFDM symbol transmitting uplink data in the transmission unit.

In S3, when a beam direction the same as at least one of beam directions used for transmitting uplink data in the transmission unit exists in PUCCHs of receiving ends of different beam directions, UCI with a beam direction the same as at least one of beam directions transmitting the uplink data is carried in a PUCCH in an OFDM symbol immediately before or after an OFDM symbol transmitting uplink data in the transmission unit. The configured or specified OFDM symbol transmitting a PUCCH is an OFDM symbol adjacent to the OFDM symbol transmitting uplink data in the transmission unit; or, the configured or specified OFDM symbol transmitting a PUCCH is at least two continuous OFDM symbols starting from an OFDM symbol adjacent to the OFDM symbol transmitting uplink data in the transmission unit.

In S4, when multiple uplink controls located in different OFDM symbols exist in the transmission unit, an uplink control with a beam direction the same as at least one of beam directions transmitting uplink data in the transmission unit is configured or specified in an OFDM symbol adjacent to an OFDM symbol transmitting uplink data in the transmission unit, or is configured or specified in at least two continuous OFDM symbols starting from an OFDM symbol adjacent to an OFDM symbol transmitting uplink data in the transmission unit.

In S5, when a beam direction of uplink data and a beam direction of uplink control of the same receiving end in a transmission unit are different, the uplink control of the receiving end with the beam direction of uplink data different from the beam direction of uplink control is configured or specified in an OFDM symbol adjacent to an OFDM symbol transmitting uplink data in the transmission unit, or is configured or specified in at least two continuous OFDM symbols starting from an OFDM symbol adjacent to an OFDM symbol transmitting uplink data in the transmission unit.

In an embodiment, the storage medium is further configured to store program codes for executing a step described below.

The step in which OFDM symbols for transmitting the uplink controls are respectively configured for the receiving end in the transmission unit includes a step described below.

Configuration is performed through at least one of a physical layer signaling or a high-layer signaling. The physical layer signaling includes downlink control information. The high-layer signaling includes an RRC massage. When the physical layer signaling and the high-layer signaling are used simultaneously, the high-layer signaling configures a preset location of uplink control in the transmission unit. The preset location includes an end location of the transmission unit or a location before transmitting uplink data. The physical layer signaling configures an OFDM symbol transmitting the uplink control.

In an embodiment, the storage medium is further configured to store program codes for executing a step described below.

Before the uplink control is received from the configured or specified OFDM symbol, steps described below are further included.

In S1, a beam direction capable of being used for sending an uplink control in an OFDM symbol in which the uplink control is located in the transmission unit is specified; alternatively, in S2, a beam direction used for sending an uplink control in an OFDM symbol in which the uplink control is located in the transmission unit is configured, and when the beam direction capable of being used for sending the uplink control in the OFDM symbol in which the uplink control is located in the transmission unit is configured, a signaling is sent to inform the receiving end.

In an embodiment, the storage medium is further configured to store program codes for executing a step described below.

The step in which a beam direction capable of being used for sending uplink control in an OFDM symbol in which uplink control is located in the transmission unit is specified includes steps described below.

In S1, when the signaling is not sent to inform the beam direction used for sending the uplink control in the OFDM symbol in which the uplink control is located in the transmission unit, the beam direction capable of being used by the receiving end for sending the uplink control is defaulted as all or at least one of beam directions used for transmitting uplink data in the transmission unit.

Alternatively, in S2, when the signaling is not sent to inform the beam direction used for sending the uplink control in the OFDM symbol in which the uplink control is located in the transmission unit, the beam direction capable of being used by the receiving end for sending the uplink control is defaulted as all or at least one of beam directions used for transmitting uplink data or an uplink control in a transmission unit before the transmission unit.

Alternatively, in S3, when the signaling is not sent to inform the beam direction used for sending the uplink control in the OFDM symbol in which the uplink control is located in the transmission unit, the beam direction capable of being used by the receiving end for sending the uplink control is defaulted as all or at least one of beam directions used for receiving downlink data in the transmission unit.

A storage medium is further provided in an embodiment. In the embodiment, the storage medium may be configured to store program codes for executing steps described below.

In S1, a beam direction capable of being used for sending an uplink control in an OFDM symbol in which the uplink control is located in a transmission unit is specified, and the uplink control is received according to the specified beam direction used by the uplink control.

Alternatively, in S2, a beam direction used for sending an uplink control in an OFDM symbol in which the uplink control is located in a transmission unit is configured, and when the beam direction capable of being used for sending the uplink control in the OFDM symbol in which the uplink control is located in the transmission unit is configured, a signaling is sent to inform a receiving end, and the uplink control is received according to the configured beam direction used by the uplink control.

In an embodiment, the storage medium is further configured to store program codes for executing a step described below.

The step in which a beam direction capable of being used for sending the uplink control in an OFDM symbol in which the uplink control is located in the transmission unit is specified includes steps described below.

In S1, when the signaling is not sent to inform the beam direction used for sending the uplink control in the OFDM symbol in which the uplink control is located in the transmission unit, the beam direction capable of being used by the receiving end for sending the uplink control is defaulted as all or at least one of beam directions used for transmitting uplink data in the transmission unit.

Alternatively, in S2, when the signaling is not sent to inform the beam direction used for sending the uplink control in the OFDM symbol in which the uplink control is located in the transmission unit, the beam direction capable of being used by the receiving end for sending the uplink control is defaulted as all or at least one of beam directions used for transmitting uplink data or an uplink control in a transmission unit before the transmission unit.

Alternatively, in S3, when the signaling is not sent to inform the beam direction used for sending the uplink control in the OFDM symbol in which the uplink control is located in the transmission unit, the beam direction capable of being used by the receiving end for sending the uplink control is defaulted as all or at least one of beam directions used for receiving downlink data in the transmission unit.

A storage medium is further provided in an embodiment. In the embodiment, the storage medium may be configured to store program codes for executing steps described below.

In S1, a receiving end determines an OFDM symbol in which an uplink control of the receiving end is located in a transmission unit.

In S2, the uplink control is sent in the determined OFDM symbol.

In an embodiment, the storage medium is further configured to store program codes for executing a step described below.

The step in which a receiving end determines an OFDM symbol in which uplink control of the receiving end is located in a transmission unit includes at least one of steps described below.

In S1, when a beam direction of the uplink control is the same as a beam direction used for transmitting uplink data in the transmission unit, the receiving end determines the OFDM symbol in which the uplink control is located in the transmission unit as an OFDM symbol adjacent to an OFDM symbol transmitting uplink data in the transmission unit, or the receiving end determines the OFDM symbol in which the uplink control is located in the transmission unit as at least two continuous OFDM symbols starting from an OFDM symbol adjacent to an OFDM symbol transmitting uplink data in the transmission unit.

In S2, when multiple beam directions used for transmitting uplink data in the transmission unit exist and a beam direction of the uplink control is the same as at least one of beam directions used for transmitting uplink data in the transmission unit, the receiving end determines the OFDM symbol in which the uplink control is located in the transmission unit as an OFDM symbol adjacent to an OFDM symbol transmitting uplink data in the transmission unit, or the receiving end determines the OFDM symbol in which the uplink control is located in the transmission unit as at least two continuous OFDM symbols starting from an OFDM symbol adjacent to an OFDM symbol transmitting uplink data in the transmission unit.

In S3, when a beam direction the same as at least one of beam directions used for transmitting uplink data in the transmission unit exists in PUCCHs of receiving ends of different beam directions, UCI with a beam direction the same as at least one of beam directions transmitting the uplink data is carried in a PUCCH in an OFDM symbol immediately before or after an OFDM symbol transmitting uplink data in the transmission unit. The OFDM symbol determined by the receiving end, in which the uplink control is located in the transmission unit, is an OFDM symbol adjacent to the OFDM symbol transmitting uplink data in the transmission unit, or the OFDM symbol determined by the receiving end, in which the uplink control is located in the transmission unit, is at least two continuous OFDM symbols starting from an OFDM symbol adjacent to the OFDM symbol transmitting uplink data in the transmission unit.

In S4, when multiple uplink controls located in different OFDM symbols exist in the transmission unit and a beam direction of the uplink control is the same as at least one of beams directions used for transmitting uplink data in the transmission unit, the receiving end determines the OFDM symbol in which the uplink control is located in the transmission unit as an OFDM symbol adjacent to an OFDM symbol transmitting uplink data in the transmission unit, or the receiving end determines the OFDM symbol in which the uplink control is located in the transmission unit as at least two continuous OFDM symbols starting from an OFDM symbol adjacent to an OFDM symbol transmitting uplink data in the transmission unit.

In S5, when a beam direction of uplink data of the receiving end is different from a beam direction of the uplink control of the receiving end, the receiving end determines the OFDM symbol in which the uplink control is located in the transmission unit as an OFDM symbol adjacent to an OFDM symbol transmitting uplink data in the transmission unit, or the receiving end determines the OFDM symbol in which the uplink control is located in the transmission unit as at least two continuous OFDM symbols starting from an OFDM symbol adjacent to an OFDM symbol transmitting uplink data in the transmission unit.

In an embodiment, the storage medium is further configured to store program codes for executing steps described below.

In S1, before the receiving end determines the OFDM symbol in which the uplink control is located in the transmission unit, a step is further included: receiving at least one of physical layer signaling or high-layer signaling. The physical layer signaling includes downlink control information. The high-layer signaling includes an RRC message. When the physical layer signaling and the high-layer signaling are used simultaneously, the high-layer signaling configures a preset location of uplink control in the transmission unit. The preset location includes an end location of the transmission unit or a location before transmitting uplink data. The physical layer signaling configures an OFDM symbol transmitting the uplink control.

In S2, the step in which the receiving end determines the OFDM symbol in which the uplink control is located in the transmission unit includes: according to at least one of the received physical layer signaling or high-layer signaling, the receiving end determines the OFDM symbol in which the uplink control is located in the transmission unit.

In an embodiment, the storage medium is further configured to store program codes for executing a step described below.

The step in which the receiving end determines the OFDM symbol in which the uplink control is located in the transmission unit includes steps described below.

When the receiving end transmits uplink data in the transmission unit, the OFDM symbol in which the uplink control is located is automatically adjusted to be an OFDM symbol adjacent to an OFDM symbol for transmitting uplink data in the transmission unit, or is automatically adjusted to be at least two continuous OFDM symbols starting from an OFDM symbol adjacent to an OFDM symbol transmitting uplink data in the transmission unit, where the being continuous includes: being continuous forward or being continuous backward.

In an embodiment, the storage medium is further configured to store program codes for executing steps described below.

In S1, before the uplink control is sent in the determined OFDM symbol, a step is further included: determining a determined beam direction used for transmitting uplink control in the OFDM symbol in which the uplink control is located.

In S2, the step in which the uplink control is sent in the determined OFDM symbol includes: sending the uplink control using the determined beam direction in the determined OFDM symbol.

In an embodiment, the storage medium is further configured to store program codes for executing a step described below.

The step in which a beam direction used for transmitting uplink control in the OFDM symbol in which the uplink control is located is determined includes steps described below.

In S1, when signaling for informing the receiving end of the beam direction used for transmitting the uplink control in the OFDM symbol in which the uplink control is located is received, the beam direction used for transmitting the uplink control in the OFDM symbol in which the uplink control is located is determined as a beam direction indicated in the received signaling.

Alternatively, in S2, when signaling for informing the receiving end of the beam direction used for transmitting the uplink control in the OFDM symbol in which the uplink control is located is not received, all or at least one of beam directions used for transmitting uplink data in the transmission unit are used by default.

Alternatively, in S3, when signaling for informing the receiving end of the beam direction used for transmitting the uplink control in the OFDM symbol in which the uplink control is located is not received, all or at least one of beam directions used for transmitting uplink data or an uplink control in a transmission unit before the transmission unit are used by default.

Alternatively, in S4, when signaling for informing the receiving end of a beam direction used for sending uplink control in the OFDM symbol in which the uplink control is located in the transmission unit is not received, all or at least one of beam directions used for receiving downlink data in the transmission unit are used by default.

A storage medium is further provided in an embodiment. In the embodiment, the storage medium may be configured to store program codes for executing steps described below.

In S1, a beam direction used for transmitting uplink control in an OFDM symbol in which the uplink control is located is determined.

In S2, the uplink control is sent using the determined beam direction.

In an embodiment, the storage medium is further configured to store program codes for executing a step described below.

The step in which a beam direction used for transmitting uplink control in the OFDM symbol in which the uplink control is located is determined includes steps described below.

In S1, when signaling for informing the beam direction used for transmitting the uplink control in the OFDM symbol in which the uplink control is located is received, the beam direction used for transmitting the uplink control in the OFDM symbol in which the uplink control is located is determined as a beam direction indicated in the received signaling.

Alternatively, in S2, when signaling for informing the beam direction used for transmitting the uplink control in the OFDM symbol in which the uplink control is located is not received, all or at least one of beam directions used for transmitting uplink data in a transmission unit are used by default.

Alternatively, in S3, when signaling for informing the beam direction used for transmitting the uplink control in the OFDM symbol in which the uplink control is located is not received, all or at least one of beam directions used for transmitting uplink data or an uplink control in a transmission unit before the transmission unit are used by default.

Alternatively, in S4, when signaling for informing the receiving end of a beam direction used for sending uplink control in the OFDM symbol in which the uplink control is located in the transmission unit is not received, all or at least one of beam directions used for receiving downlink data in the transmission unit are used by default.

In an embodiment, the storage medium may include a USB flash disk, a read-only memory (ROM), a random access memory (RAM), a mobile hard disk, a magnetic disk, an optical disk or another medium capable of storing the program codes.

In an embodiment, the processor executes the steps of the methods described in the preceding embodiments according to the program codes stored in the storage medium.

INDUSTRIAL APPLICABILITY

The uplink control receiving method and device and the uplink control sending method and device are provided by the present disclosure, since the location of an OFDM symbol which is configured or specified by a sending end for the receiving end in a transmission unit and used for transmitting uplink control in the transmission unit and the location of an OFDM symbol in which uplink data is located in the transmission unit remain continuous, the occurrence of a gap between the sending of uplink data and the sending of uplink control by the receiving end is avoided. Therefore, problems of complicated processing existing in a configuration manner of locations of OFDM symbols for uplink controls of receiving ends in the related art may be solved, and a performance of reducing uplink control processing complexity may be achieved.

What is claimed is:

1. An uplink control receiving method, comprising:
    configuring or specifying, for a receiving end, an orthogonal frequency division multiplexing (OFDM) symbol for transmitting an uplink control in a transmission unit, wherein a location of the OFDM symbol in which the uplink control is located in the transmission unit and a location of an OFDM symbol in which uplink data is located in the transmission unit remain continuous; and
    receiving the uplink control from the configured or specified OFDM symbol;
    wherein before receiving the uplink control from the configured or specified OFDM symbol, the method further comprises: specifying a beam direction used for sending the uplink control in the OFDM symbol in which the uplink control is located in the transmission unit; and
    wherein the specifying the beam direction used for sending the uplink control in the OFD M symbol in which the uplink control is located in the transmission unit comprises: in response to determining that a signaling is not sent to inform the beam direction used for sending the uplink control in the OFDM symbol in which the uplink control is located in the transmission unit, defaulting the beam direction used by the receiving end for sending the uplink control as all or at least one of beam directions used for transmitting uplink data in a previous transmission unit, wherein the previous transmission unit refers to a transmission unit before the transmission unit.

2. The uplink control receiving method of claim 1, wherein the configuring or specifying, for the receiving end, the OFDM symbol for transmitting the uplink control in the transmission unit comprises:

configuring or specifying, for the receiving end, the OFDM symbol for transmitting the uplink control in the transmission unit according to at least one of a beam direction of the receiving end, a beam direction of the transmission unit or a quantity of radio frequency links of a sending end;

wherein the beam direction of the receiving end comprises at least one of: a beam direction of uplink data of the receiving end, or a beam direction of the uplink control of the receiving end; and the beam direction of the transmission unit comprises at least one of: a beam direction used for transmitting the uplink data in the transmission unit, or a beam direction used for transmitting the uplink control in the transmission unit.

3. The uplink control receiving method of claim 1, wherein the configuring or specifying, for the receiving end, the OFDM symbol for transmitting the uplink control in the transmission unit comprises at least one of:

in response to determining that uplink controls of a plurality of beam directions need to be transmitted in the transmission unit, configuring or specifying an uplink control with a beam direction identical to a beam direction used for transmitting the uplink data in the transmission unit in an OFDM symbol adjacent to an OFDM symbol transmitting the uplink data in the transmission unit, or in at least two continuous OFDM symbols starting from an OFDM symbol adjacent to an OFDM symbol transmitting the uplink data in the transmission unit;

in response to determining that the sending end has a plurality of radio frequency links and a plurality of beam directions transmitting the uplink data in the transmission unit exist, configuring or specifying an uplink control with a beam direction identical to at least one of beam directions used for transmitting the uplink data in the transmission unit in an OFDM symbol adjacent to an OFDM symbol transmitting the uplink data in the transmission unit, or in at least two continuous OFDM symbols starting from an OFDM symbol adjacent to an OFDM symbol transmitting the uplink data in the transmission unit;

in response to determining that a beam direction identical to at least one of beam directions used for transmitting the uplink data in the transmission unit exists in physical uplink control channels (PUCCHs) of receiving ends of different beam directions, carrying uplink control information (UCI) with a beam direction identical to at least one of beam directions transmitting the uplink data in a PUCCH in an OFDM symbol immediately before or after an OFDM symbol transmitting the uplink data in the transmission unit, wherein a configured or specified OFDM symbol transmitting a PUCCH is an OFDM symbol adjacent to the OFDM symbol transmitting the uplink data in the transmission unit; or, a configured or specified OFDM symbol transmitting a PUCCH is at least two continuous OFDM symbols starting from an OFDM symbol adjacent to the OFDM symbol transmitting the uplink data in the transmission unit;

in response to determining that a plurality of uplink controls located in different OFDM symbols exist in the transmission unit, configuring or specifying an uplink control with a beam direction identical to at least one of beam directions transmitting the uplink data in the transmission unit in an OFDM symbol adjacent to an OFDM symbol transmitting the uplink data in the transmission unit, or in at least two continuous OFDM symbols starting from an OFDM symbol adjacent to an OFDM symbol transmitting the uplink data in the transmission unit; or in response to determining that a beam direction of uplink data and a beam direction of uplink control of a same receiving end in a transmission unit are different, configuring or specifying the uplink control of the receiving end with the beam direction of the uplink data different from the beam direction of the uplink control in an OFDM symbol adjacent to an OFDM symbol transmitting the uplink data in the transmission unit, or in at least two continuous OFDM symbols starting from an OFDM symbol adjacent to an OFDM symbol transmitting the uplink data in the transmission unit.

4. The uplink control receiving method of claim 1, wherein the configuring, for the receiving end, the OFDM symbol for transmitting the uplink control in the transmission unit comprises:

performing a configuration through at least one of a physical layer signaling or a high-layer signaling, wherein the physical layer signaling comprises downlink control information, the high-layer signaling comprises a radio resource control (RRC) massage, the high-layer signaling configures a preset location of the uplink control in the transmission unit when the physical layer signaling and the high-layer signaling are used simultaneously, the preset location comprises an end location of the transmission unit or a location before transmitting the uplink data in the transmission unit, and the physical layer signaling configures the OFDM symbol for transmitting the uplink control.

5. The uplink control receiving method of claim 1, wherein the uplink control meets at least one of:

the uplink control of one receiving end occupying at least one OFDM symbol;

the uplink control being configured to send acknowledgement/negative-acknowledgement (ACK/NACK) information, channel state information (CSI), or beam direction information;

the uplink control being located in an OFDM symbol at an end of the transmission unit;

the uplink control being located in an OFDM symbol before an OFDM symbol transmitting the uplink data in the transmission unit; or the uplink control being an area for transmitting a PUCCH, or an area for transmitting UCI.

6. An uplink control sending method, comprising:

determining an orthogonal frequency division multiplexing (OFDM) symbol in which an uplink control of a receiving end is located in a transmission unit;

determining a beam direction used for transmitting the uplink control; and sending the uplink control using the determined beam direction in the determined OFDM symbol;

wherein the determining the beam direction used for transmitting the uplink control comprises: in response to the receiving end not receiving a configuration signaling which configures the beam direction used for transmitting the uplink control, determining, by the receiving end, to use a specified beam direction for transmitting the uplink control; and wherein the determining to use the specified beam direction for transmitting the uplink control comprises: in response to not sending a signaling for informing of the beam direction used for transmitting the uplink control in the transmission unit, using by default all or at least one of beam directions used for transmitting uplink data in a previous transmission unit as the beam direction used by the receiving end for transmitting the uplink control, wherein the previous transmission unit refers to a transmission unit before the transmission unit.

7. The uplink control sending method of claim 6, wherein the determining the OFDM symbol in which the uplink control of the receiving end is located in the transmission unit comprises at least one of:
in response to determining that a beam direction of the uplink control is identical to a beam direction used for transmitting uplink data in the transmission unit, determining, by the receiving end, the OFDM symbol in which the uplink control is located in the transmission unit as an OFDM symbol adjacent to an OFDM symbol transmitting the uplink data in the transmission unit, or determining, by the receiving end, the OFDM symbol in which the uplink control is located in the transmission unit as at least two continuous OFDM symbols starting from an OFDM symbol adjacent to an OFDM symbol transmitting the uplink data in the transmission unit;
in response to determining that a plurality of beam directions used for transmitting uplink data in the transmission unit exist and a beam direction of the uplink control is identical to at least one of beam directions used for transmitting the uplink data in the transmission unit, determining, by the receiving end, the OFDM symbol in which the uplink control is located in the transmission unit as an OFDM symbol adjacent to an OFDM symbol transmitting the uplink data in the transmission unit, or determining, by the receiving end, the OFDM symbol in which the uplink control is located in the transmission unit as at least two continuous OFDM symbols starting from an OFDM symbol adjacent to an OFDM symbol transmitting the uplink data in the transmission unit;
in response to determining that a beam direction identical to at least one of beam directions used for transmitting uplink data in the transmission unit exists in physical uplink control channels (PUCCHs) of receiving ends of different beam directions, carrying uplink control information (UCI) with a beam direction identical to at least one of beam directions transmitting the uplink data in a PUCCH in an OFDM symbol immediately before or after an OFDM symbol transmitting the uplink data in the transmission unit, wherein the OFDM symbol determined by the receiving end, in which the uplink control is located in the transmission unit, is an OFDM symbol adjacent to the OFDM symbol transmitting the uplink data in the transmission unit, or the OFDM symbol determined by the receiving end, in which the uplink control is located in the transmission unit, is at least two continuous OFDM symbols starting from an OFDM symbol adjacent to the OFDM symbol transmitting the uplink data in the transmission unit;
in response to determining that a plurality of uplink controls located in different OFDM symbols exist in the transmission unit and a beam direction of the uplink control is identical to at least one of beams directions used for transmitting uplink data in the transmission unit, determining, by the receiving end, the OFDM symbol in which the uplink control is located in the transmission unit as an OFDM symbol adjacent to an OFDM symbol transmitting the uplink data in the transmission unit, or determining, by the receiving end, the OFDM symbol in which the uplink control is located in the transmission unit as at least two continuous OFDM symbols starting from an OFDM symbol adjacent to an OFDM symbol transmitting the uplink data in the transmission unit; or
in response to determining that a beam direction of uplink data of the receiving end is different from a beam direction of the uplink control of the receiving end, determining, by the receiving end, the OFDM symbol in which the uplink control is located in the transmission unit as an OFDM symbol adjacent to an OFDM symbol transmitting the uplink data in the transmission unit, or determining, by the receiving end, the OFDM symbol in which the uplink control is located in the transmission unit as at least two continuous OFDM symbols starting from an OFDM symbol adjacent to an OFDM symbol transmitting the uplink data in the transmission unit.

8. The uplink control sending method of claim 6, wherein before determining the OFDM symbol in which the uplink control of the receiving end is located in the transmission unit, the method further comprises:
receiving at least one of a physical layer signaling or a high-layer signaling, wherein the physical layer signaling comprises downlink control information, the high-layer signaling comprises a radio resource control (RRC) message, the high-layer signaling configures a preset location of the uplink control in the transmission unit when the physical layer signaling and the high-layer signaling are used simultaneously, the preset location comprises an end location of the transmission unit or a location before transmitting uplink data in the transmission unit, and the physical layer signaling configures the OFDM symbol for transmitting the uplink control; and
the determining, by the receiving end, the OFDM symbol in which the uplink control is located in the transmission unit comprises: according to at least one of the received physical layer signaling or the high-layer signaling, determining, by the receiving end, the OFDM symbol in which the uplink control is located in the transmission unit.

9. The uplink control sending method of claim 6, wherein the determining the OFDM symbol in which the uplink control of the receiving end is located in the transmission unit comprises:
when the receiving end transmits uplink data in the transmission unit, automatically adjusting the OFDM symbol in which the uplink control is located to be an OFDM symbol adjacent to an OFDM symbol for transmitting the uplink data in the transmission unit, or automatically adjusting the OFDM symbol in which the uplink control is located to be at least two continuous OFDM symbols starting from an OFDM symbol adjacent to an OFDM symbol transmitting the uplink data in the transmission unit, wherein the being continuous comprises: being continuous forward or being continuous backward.

10. The uplink control sending method of claim 6, wherein the configuration signaling configures the beam direction for transmitting the uplink control through a high-layer signaling.

11. The uplink control sending method of claim 6, wherein the uplink control meets at least one of:
the uplink control occupying at least one OFDM symbol;

the uplink control being configured to send acknowledgement/negative-acknowledgement (ACK/NACK) information, channel state information (CSI), or beam direction information;

the uplink control being located in an OFDM symbol at an end of the transmission unit, and/or, the uplink control being located in an OFDM symbol before an OFDM symbol transmitting uplink data in the transmission unit; or the uplink control being an area for transmitting a physical uplink control channel (PUCCH), or an area for transmitting uplink control information (UCI).

12. A base station, comprising: a processor and a transmission device, wherein the processor is configured to configure or specify, for a receiving end, an orthogonal frequency division multiplexing (OFDM) symbol for transmitting uplink control in a transmission unit, wherein a location of the OFDM symbol in which the uplink control is located in the transmission unit and a location of an OFDM symbol in which uplink data is located in the transmission unit remain continuous; and the transmission device is configured to receive the uplink control from the configured or specified OFDM symbol;

wherein the processor is configured to specify a beam direction used for sending the uplink control in the OFDM symbol in which the uplink control is located in the transmission unit; and wherein the processor is configured to in response to determining that a signaling is not sent to inform the beam direction used for sending the uplink control in the OFDM symbol in which the uplink control is located in the transmission unit, default the beam direction used by the receiving end for sending the uplink control as all or at least one of beam directions used for transmitting uplink data in a previous transmission unit, wherein the previous transmission unit refers to a transmission unit before the transmission unit.

13. The base station of claim 12, wherein the processor is further configured to execute at least one of:

in response to determining that uplink controls of a plurality of beam directions need to be transmitted in the transmission unit, configuring or specifying an uplink control with a beam direction identical to a beam direction used for transmitting the uplink data in the transmission unit in an OFDM symbol adjacent to an OFDM symbol transmitting the uplink data in the transmission unit, or in at least two continuous OFDM symbols starting from an OFDM symbol adjacent to an OFDM symbol transmitting the uplink data in the transmission unit;

in response to determining that the sending end has a plurality of radio frequency links and a plurality of beam directions transmitting the uplink data in the transmission unit exist, configuring or specifying an uplink control with a beam direction identical to at least one of beam directions used for transmitting the uplink data in the transmission unit in an OFDM symbol adjacent to an OFDM symbol transmitting the uplink data in the transmission unit, or in at least two continuous OFDM symbols starting from an OFDM symbol adjacent to an OFDM symbol transmitting the uplink data in the transmission unit;

in response to determining that a beam direction identical to at least one of beam directions used for transmitting the uplink data in the transmission unit exists in physical uplink control channels (PUCCHs) of receiving ends of different beam directions, carrying uplink control information (UCI) with a beam direction identical to at least one of beam directions transmitting the uplink data in a PUCCH in an OFDM symbol immediately before or after an OFDM symbol transmitting the uplink data in the transmission unit, wherein a configured or specified OFDM symbol transmitting a PUCCH is an OFDM symbol adjacent to the OFDM symbol transmitting the uplink data in the transmission unit; or, a configured or specified OFDM symbol transmitting a PUCCH is at least two continuous OFDM symbols starting from an OFDM symbol adjacent to the OFDM symbol transmitting the uplink data in the transmission unit;

in response to determining that a plurality of uplink controls located in different OFDM symbols exist in the transmission unit, configuring or specifying an uplink control with a beam direction identical to at least one of beam directions transmitting the uplink data in the transmission unit in an OFDM symbol adjacent to an OFDM symbol transmitting the uplink data in the transmission unit, or in at least two continuous OFDM symbols starting from an OFDM symbol adjacent to an OFDM symbol transmitting the uplink data in the transmission unit; or in response to determining that a beam direction of uplink data and a beam direction of uplink control of a same receiving end in a transmission unit are different, configuring or specifying the uplink control of the receiving end with the beam direction of the uplink data different from the beam direction of uplink control in an OFDM symbol adjacent to an OFDM symbol transmitting the uplink data in the transmission unit, or in at least two continuous OFDM symbols starting from an OFDM symbol adjacent to an OFDM symbol transmitting the uplink data in the transmission unit.

14. The base station of claim of 12, wherein the processor is further configured to perform a configuration through at least one of a physical layer signaling or a high-layer signaling, wherein the physical layer signaling comprises downlink control information, the high-layer signaling comprises a radio resource control (RRC) message, the high-layer signaling configures a preset location of the uplink control in the transmission unit when the physical layer signaling and the high-layer signaling are used simultaneously, the preset location comprises an end location of the transmission unit or a location before transmitting the uplink data in the transmission unit, and the physical layer signaling configures the OFDM symbol for transmitting the uplink control.

15. A user equipment, comprising: a processor and a transmission device, wherein the processor is configured to determine an orthogonal frequency division multiplexing (OFDM) symbol in which an uplink control of the user equipment is located in a transmission unit, and to determine a beam direction used for transmitting the uplink control; and the transmission device is configured to send the uplink control in the determined OFDM symbol;

wherein the processor is configured to in response to the user equipment not receiving a configuration signaling which configures the beam direction used for transmitting the uplink control, determine to use a specified beam direction for transmitting the uplink control; and wherein the processor is configured to in response to not sending a signaling for informing of the beam direction used for transmitting the uplink control in the transmission unit, use by default all or at least one of beam directions used for transmitting uplink data in a previous transmission unit as the beam direction used by the user equipment for transmitting the uplink control, wherein the previous transmission unit refers to a transmission unit before the transmission unit.

16. The user equipment of claim 15, wherein the processor is further configured to execute at least one of:

in response to determining that a beam direction of the uplink control is identical to a beam direction used for transmitting uplink data in the transmission unit, determining, by the user equipment, the OFDM symbol in which the uplink control is located in the transmission unit as an OFDM symbol adjacent to an OFDM symbol transmitting the uplink data in the transmission unit, or determining, by the user equipment, the OFDM symbol in which the uplink control is located in the transmission unit as at least two continuous OFDM symbols starting from an OFDM symbol adjacent to an OFDM symbol transmitting the uplink data in the transmission unit;

in response to determining that a plurality of beam directions used for transmitting uplink data in the transmission unit exist and a beam direction of the uplink control is identical to at least one of beam directions used for transmitting the uplink data in the transmission unit, determining, by the user equipment, the OFDM symbol in which the uplink control is located in the transmission unit as an OFDM symbol adjacent to an OFDM symbol transmitting the uplink data in the transmission unit, or determining, by the user equipment, the OFDM symbol in which the uplink control is located in the transmission unit as at least two continuous OFDM symbols starting from an OFDM symbol adjacent to an OFDM symbol transmitting the uplink data in the transmission unit;

in response to determining that a beam direction identical to at least one of beam directions used for transmitting uplink data in the transmission unit exists in physical uplink control channels (PUCCHs) of receiving ends of different beam directions, carrying uplink control information (UCI) with a beam direction identical to at least one of beam directions transmitting the uplink data in a PUCCH in an OFDM symbol immediately before or after an OFDM symbol transmitting the uplink data in the transmission unit, wherein the OFDM symbol determined by the user equipment, in which the uplink control is located in the transmission unit, is an OFDM symbol adjacent to the OFDM symbol transmitting the uplink data in the transmission unit, or the OFDM symbol determined by the user equipment, in which the uplink control is located in the transmission unit, is at least two continuous OFDM symbols starting from an OFDM symbol adjacent to the OFDM symbol transmitting the uplink data in the transmission unit;

in response to determining that a plurality of uplink controls located in different OFDM symbols exist in the transmission unit and a beam direction of the uplink control is identical to at least one of beams directions used for transmitting uplink data in the transmission unit, determining, by the user equipment, the OFDM symbol in which the uplink control is located in the transmission unit as an OFDM symbol adjacent to an OFDM symbol transmitting the uplink data in the transmission unit, or determining, by the user equipment, the OFDM symbol in which the uplink control is located in the transmission unit as at least two continuous OFDM symbols starting from an OFDM symbol adjacent to an OFDM symbol transmitting the uplink data in the transmission unit; or in response to determining that a beam direction of uplink data of the user equipment is different from a beam direction of the uplink control of the user equipment, determining, by the user equipment, the OFDM symbol in which the uplink control is located in the transmission unit as an OFDM symbol adjacent to an OFDM symbol transmitting the uplink data in the transmission unit, or determining, by the user equipment, the OFDM symbol in which the uplink control is located in the transmission unit as at least two continuous OFDM symbols starting from an OFDM symbol adjacent to an OFDM symbol transmitting the uplink data in the transmission unit.

17. The user equipment of claim 15, wherein the transmission device is further configured to receive at least one of a physical layer signaling or a high-layer signaling, wherein the physical layer signaling comprises downlink control information, the high-layer signaling comprises a radio resource control (RRC) message, the high-layer signaling configures a preset location of the uplink control in the transmission unit when the physical layer signaling and the high-layer signaling are used simultaneously, the preset location comprises an end location of the transmission unit or a location before transmitting uplink data in the transmission unit, and the physical layer signaling configures the OFDM symbol for transmitting the uplink control; and the processor is further configured to determine, by the user equipment, the OFDM symbol in which the uplink control is located in the transmission unit according to at least one of the received physical layer signaling or the high-layer signaling.

18. The user equipment of claim 15, wherein the processor is further configured to, when the user equipment transmits uplink data in the transmission unit, automatically adjust the OFDM symbol in which the uplink control is located to be an OFDM symbol adjacent to an OFDM symbol for transmitting the uplink data in the transmission unit, automatically adjust the OFDM symbol in which the uplink control is located to be at least two continuous OFDM symbols starting from an OFDM symbol adjacent to an OFDM symbol transmitting the uplink data in the transmission unit, wherein the being continuous comprises: being continuous forward or being continuous backward.

* * * * *

UNITED STATES PATENT AND TRADEMARK OFFICE
CERTIFICATE OF CORRECTION

PATENT NO. : 11,558,099 B2
APPLICATION NO. : 16/484100
DATED : January 17, 2023
INVENTOR(S) : Wei Gou et al.

It is certified that error appears in the above-identified patent and that said Letters Patent is hereby corrected as shown below:

In the Drawings

On Sheet 2 of 7, Line 3, Reference Number 502, FIG. 5, delete "contro" and insert --control--.

In the Specification

In Column 15, Line 19, delete "OFMD" and insert --OFDM--.

In Column 15, Line 32, delete "OFMD" and insert --OFDM--.

In Column 15, Line 41, delete "OFMD" and insert --OFDM--.

In Column 16, Line 4, delete "OFMD" and insert --OFDM--.

In Column 17, Line 60, delete "ODFM" and insert --OFDM--.

In Column 20, Line 26, delete "ODFM" and insert --OFDM--.

In Column 24, Line 66, delete "ROM)" and insert --ROM--.

In Column 26, Line 47, delete "massage." and insert --message.--.

In Column 30, Line 50, delete "am" and insert --an--.

In Column 32, Line 5, delete "massage." and insert --message.--.

In Column 37, Line 36, delete "massage." and insert --message.--.

Signed and Sealed this
Sixteenth Day of May, 2023

Katherine Kelly Vidal
*Director of the United States Patent and Trademark Office*

CERTIFICATE OF CORRECTION (continued)
U.S. Pat. No. 11,558,099 B2

In the Claims

In Column 42, Claim 1, Line 53, delete "OFD M" and insert --OFDM--.

In Column 44, Claim 4, Line 24, delete "massage," and insert --message,--.

In Column 47, Claim 12, Lines 30-40, delete "wherein the processor is configured to in response to determining that a signaling is not sent to inform the beam direction used for sending the uplink control in the OFDM symbol in which the uplink control is located in the transmission unit, default the beam direction used by the receiving end for sending the uplink control as all or at least one of beam directions used for transmitting uplink data in a previous transmission unit, wherein the previous transmission unit refers to a transmission unit before the transmission unit." and insert --wherein the processor is configured to default the beam direction used by the receiving end for sending the uplink control as all or at least one of beam directions used for transmitting uplink data in a previous transmission unit in response to determining that a signaling is not sent to inform the beam direction used for sending the uplink control in the OFDM symbol in which the uplink control is located in the transmission unit, wherein the previous transmission unit refers to a transmission unit before the transmission unit.--.

In Column 48, Claim 15, Lines 63-67, delete "wherein the processor is configured to in response to the user equipment not receiving a configuration signaling which configures the beam direction used for transmitting the uplink control, determine to use a specified beam direction for transmitting the uplink control; and" and insert --wherein the processor is configured to determine to use a specified beam direction for transmitting the uplink control in response to the user equipment not receiving a configuration signaling which configures the beam direction used for transmitting the uplink control; and--.

In Column 49, Claim 15, Lines 1-9, delete "wherein the processor is configured to in response to not sending a signaling for informing of the beam direction used for transmitting the uplink control in the transmission unit, use by default all or at least one of beam directions used for transmitting uplink data in a previous transmission unit as the beam direction used by the user equipment for transmitting the uplink control, wherein the previous transmission unit refers to a transmission unit before the transmission unit" and insert --wherein the processor is configured to use by default all or at least one of beam directions used for transmitting uplink data in a previous transmission unit as the beam direction used by the user equipment for transmitting the uplink control in response to not sending a signaling for informing of the beam direction used for transmitting the uplink control in the transmission unit, wherein the previous transmission unit refers to a transmission unit before the transmission unit.--.